(12) United States Patent
Graham et al.

(10) Patent No.: US 9,381,454 B2
(45) Date of Patent: Jul. 5, 2016

(54) MATERIALS HANDLING AND TREATMENT

(71) Applicants: Neil Deryck Bray Graham, Cockburn Waters (AU); Arthur Derrick Bray Graham, North Fremantle (AU)

(72) Inventors: Neil Deryck Bray Graham, Cockburn Waters (AU); Arthur Derrick Bray Graham, North Fremantle (AU)

(73) Assignee: Z-Filter (Pty) Ltd, Canning Vale, Western Australia (AU)

( * ) Notice: Subject to any disclaimer, the term of this patent is extended or adjusted under 35 U.S.C. 154(b) by 0 days.

(21) Appl. No.: 14/149,155

(22) Filed: Jan. 7, 2014

(65) Prior Publication Data

US 2014/0144851 A1 May 29, 2014

Related U.S. Application Data

(63) Continuation of application No. 12/304,811, filed on May 19, 2009, now abandoned.

(51) Int. Cl.
*B30B 9/24* (2006.01)
*B65G 15/18* (2006.01)
(Continued)

(52) U.S. Cl.
CPC .......... *B01D 33/0565* (2013.01); *B01D 33/042* (2013.01); *B01D 33/048* (2013.01);
(Continued)

(58) Field of Classification Search
CPC ...... B30B 9/24; B30B 9/245; B01D 33/0565; B01D 33/042; B01D 33/642; B01D 33/646; B01D 33/048; B01D 33/44; B01D 2033/056; B01D 33/04; B01D 33/466; B01D 33/60; B65G 15/08; B65G 15/40

USPC ............ 100/35, 37, 104, 118, 119, 120, 122, 100/151; 198/819; 210/350, 351, 386, 400, 210/783, 396, 791
See application file for complete search history.

(56) References Cited

U.S. PATENT DOCUMENTS

| 271,387 A | 1/1883 | Wilcox ........................... 100/96 |
| 502,523 A | 8/1893 | Lockstaedt .................... 100/151 |

(Continued)

FOREIGN PATENT DOCUMENTS

| DE | 3228937 A | 2/1984 |
| DE | 3228937 A1 | 2/1984 |

(Continued)

OTHER PUBLICATIONS

China Office Action of Corresponding Chinese Patent Application, received by applicant's representative Dec. 2, 2010 (English translation).

*Primary Examiner* — Jimmy T Nguyen
(74) *Attorney, Agent, or Firm* — Matthew J. Lattig; Charter IP, LLC

(57) ABSTRACT

A belt filter apparatus for treating material to separate solid and liquid components comprises an endless belt structure adapted to circulate around a path incorporating guide roller structures around which the belt structure passes. The endless belt structure comprises an elongate belt portion of water permeable material, and has two opposed longitudinal edges. A zipper releasably connects the two longitudinal edges together to form a tubular structure with a flexible sidewall. The circulating path includes an assembly zone where the longitudinal edges are brought together and connected by the zipper to form the tubular structure, and a disassembly zone at which the zipper is released to separate the longitudinal edges and open the tubular structure. Means are provided for compressing a portion of the tubular structure to express liquid from the material contained in the tubular structure. The liquid discharges from the tubular structure through the water permeable belt portion.

25 Claims, 18 Drawing Sheets

(51) Int. Cl.
- *B65G 15/40* (2006.01)
- *B01D 33/64* (2006.01)
- *B01D 33/056* (2006.01)
- *B65G 15/08* (2006.01)
- *B01D 33/04* (2006.01)
- *B01D 33/048* (2006.01)
- *B01D 33/44* (2006.01)
- *B01D 33/052* (2006.01)

(52) U.S. Cl.
CPC ............ *B01D 33/44* (2013.01); *B01D 33/642* (2013.01); *B01D 33/646* (2013.01); *B30B 9/245* (2013.01); *B65G 15/08* (2013.01); *B65G 15/40* (2013.01); *B01D 2033/052* (2013.01)

(56) References Cited

U.S. PATENT DOCUMENTS

| | | | |
|---|---|---|---|
| 3,338,383 A | 8/1967 | Hashimoto | 198/819 |
| 3,951,809 A | 4/1976 | Kollmar | |
| 4,000,809 A | 1/1977 | Lenntoft | |
| 4,017,398 A | 4/1977 | Hartmann et al. | |
| 4,039,450 A | 8/1977 | Brown | 210/783 |
| 4,159,947 A | 7/1979 | Brooks et al. | 210/108 |
| 4,625,860 A * | 12/1986 | Kawasaki et al. | 198/819 |
| 4,809,844 A * | 3/1989 | Hashimoto et al. | 198/819 |
| 4,842,749 A | 6/1989 | Cox | |
| 4,961,862 A | 10/1990 | Janecek | |
| 5,083,658 A | 1/1992 | Siwersson et al. | |
| 5,150,783 A * | 9/1992 | Hashimoto | 198/819 |
| 7,314,141 B1 | 1/2008 | Day | 210/400 |
| 2005/0183934 A1 | 8/2005 | Mindich | |

FOREIGN PATENT DOCUMENTS

| | | |
|---|---|---|
| FR | 2599724 A1 | 12/1987 |
| FR | 2630411 A1 | 10/1989 |
| FR | 2787035 A1 | 6/2000 |
| GB | 2152000 A | 7/1985 |
| GB | 2145683 B | 11/1986 |
| GB | 2152000 B | 1/1987 |
| JP | 40-020678 B | 9/1965 |
| JP | 45-006388 B | 3/1970 |
| JP | 48-002259 A | 1/1973 |
| JP | 51-044374 A | 4/1976 |
| JP | 61-033407 A | 4/1976 |
| JP | 52-033171 A | 3/1977 |
| JP | 58-44564 B2 | 10/1983 |
| JP | 61-033407 A | 2/1986 |
| JP | 11-227923 A | 8/1999 |
| SU | 356368 A1 | 12/1972 |
| WO | WO 99/07457 A | 2/1999 |

\* cited by examiner

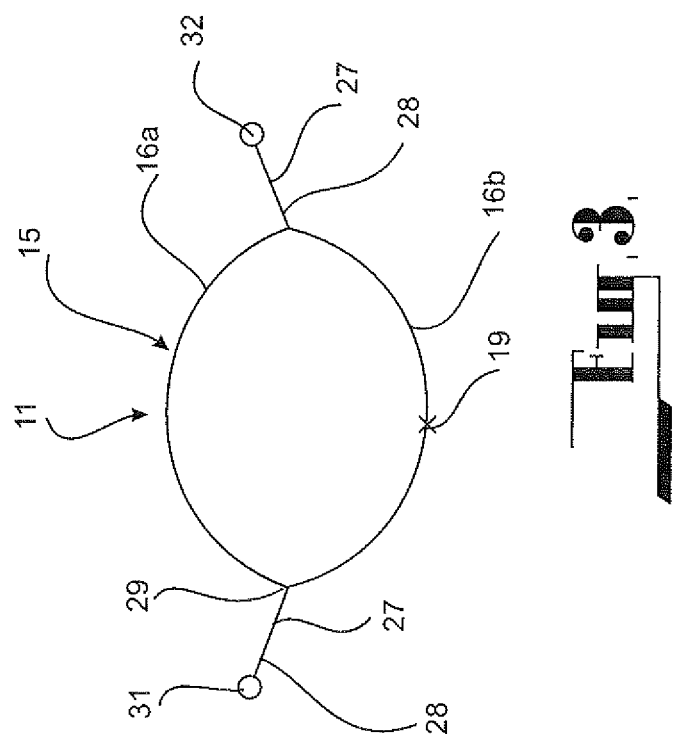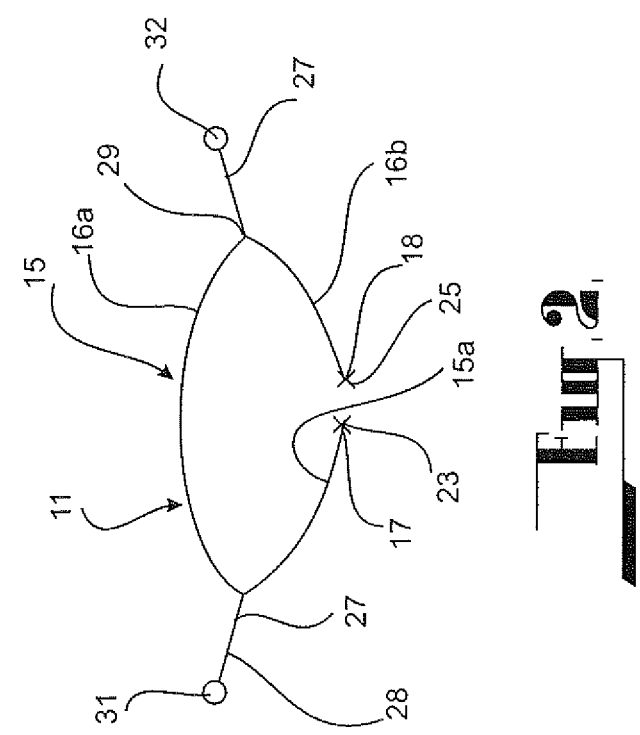

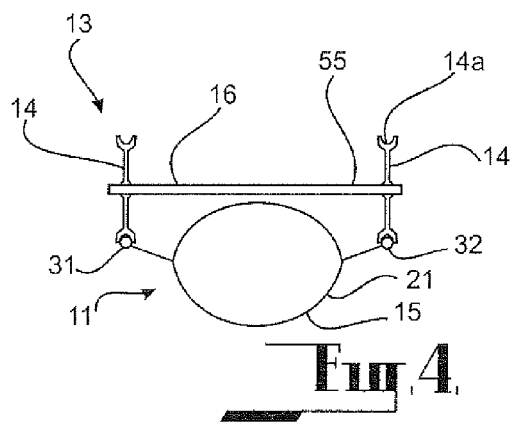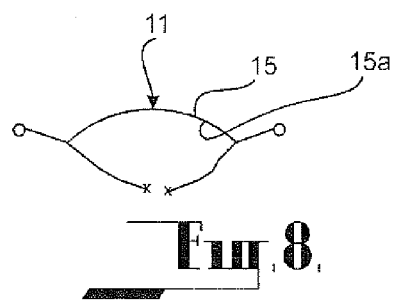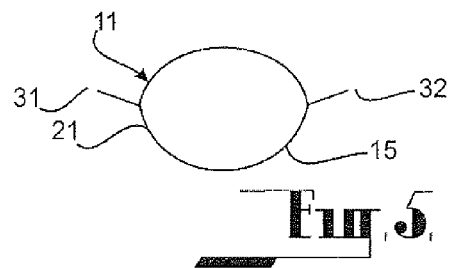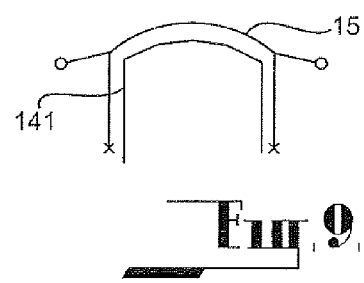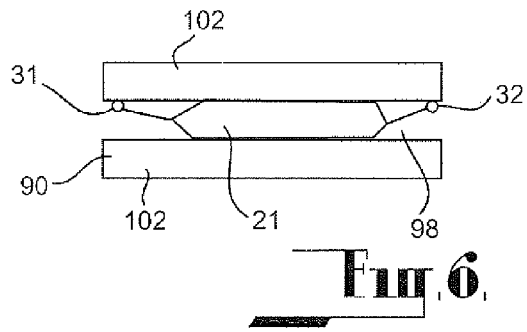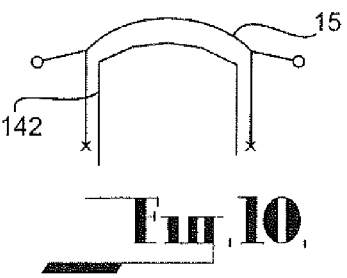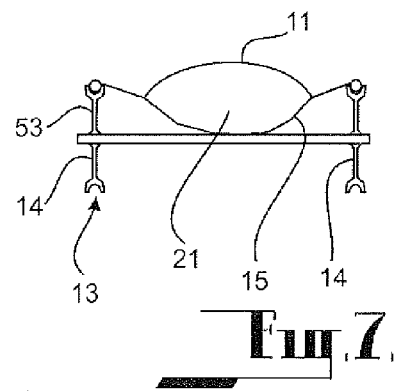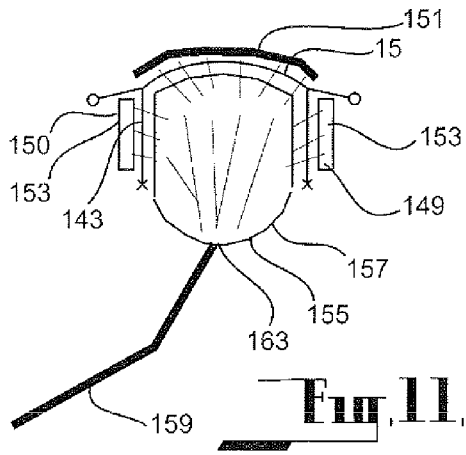

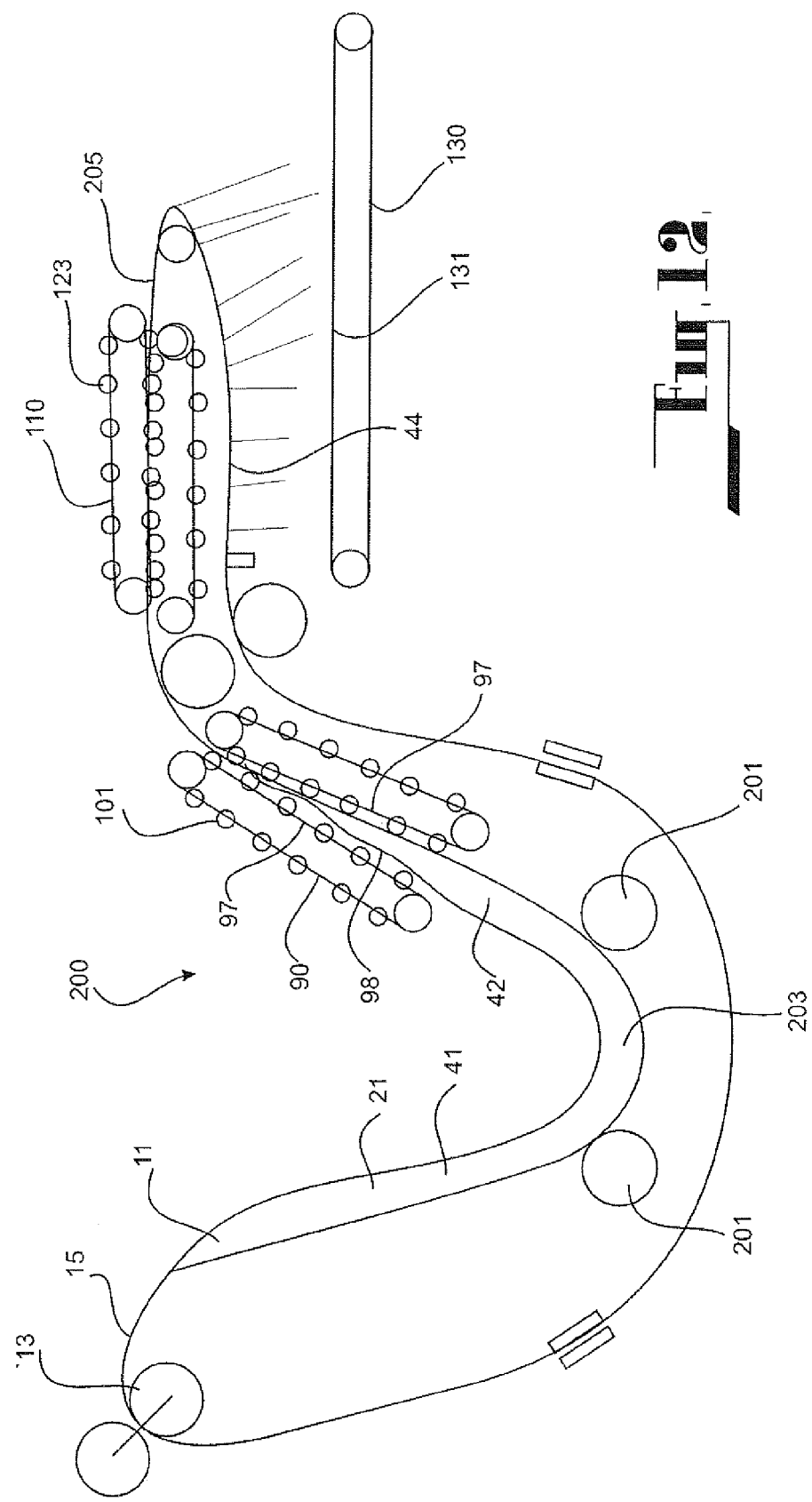

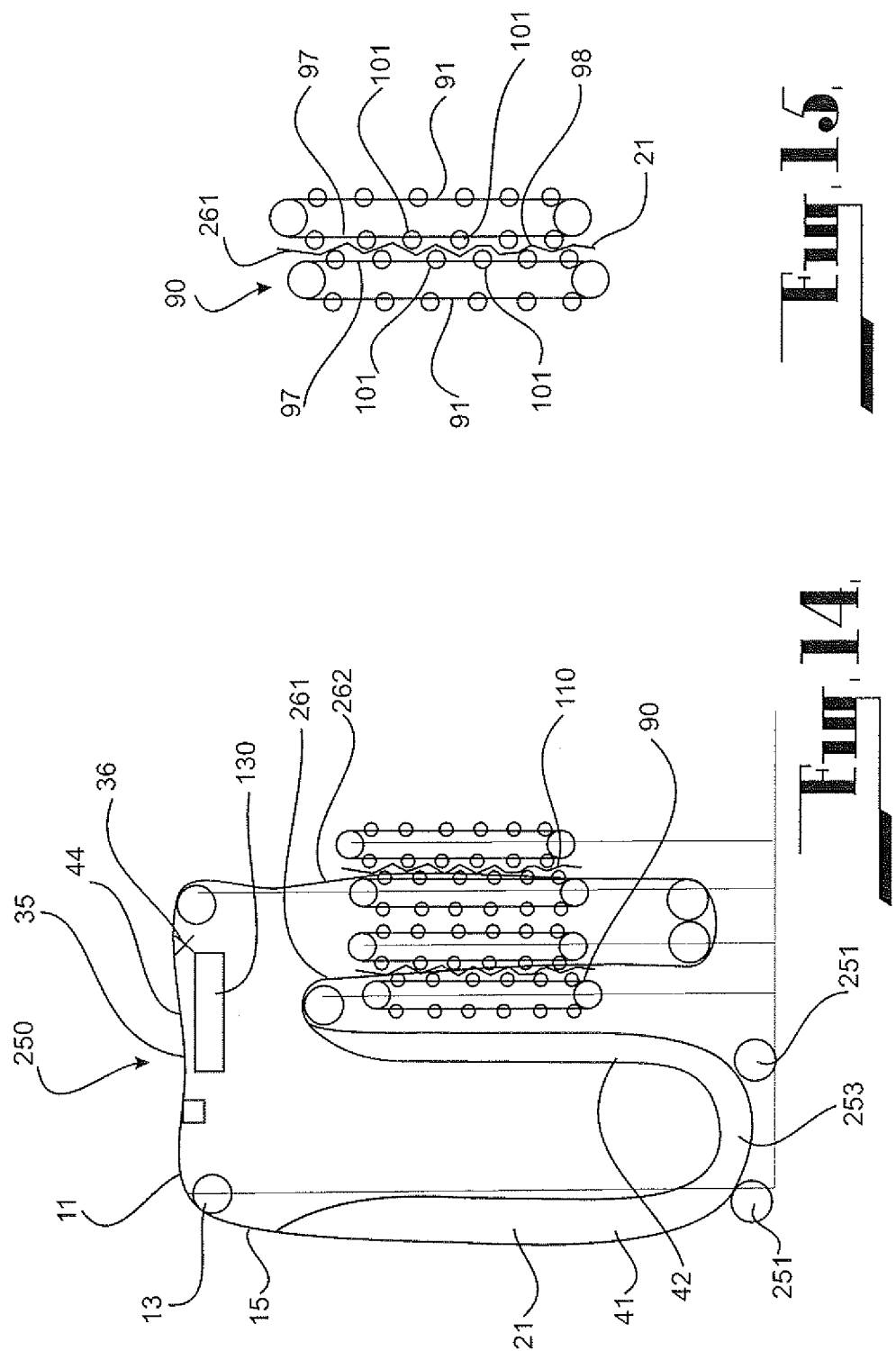

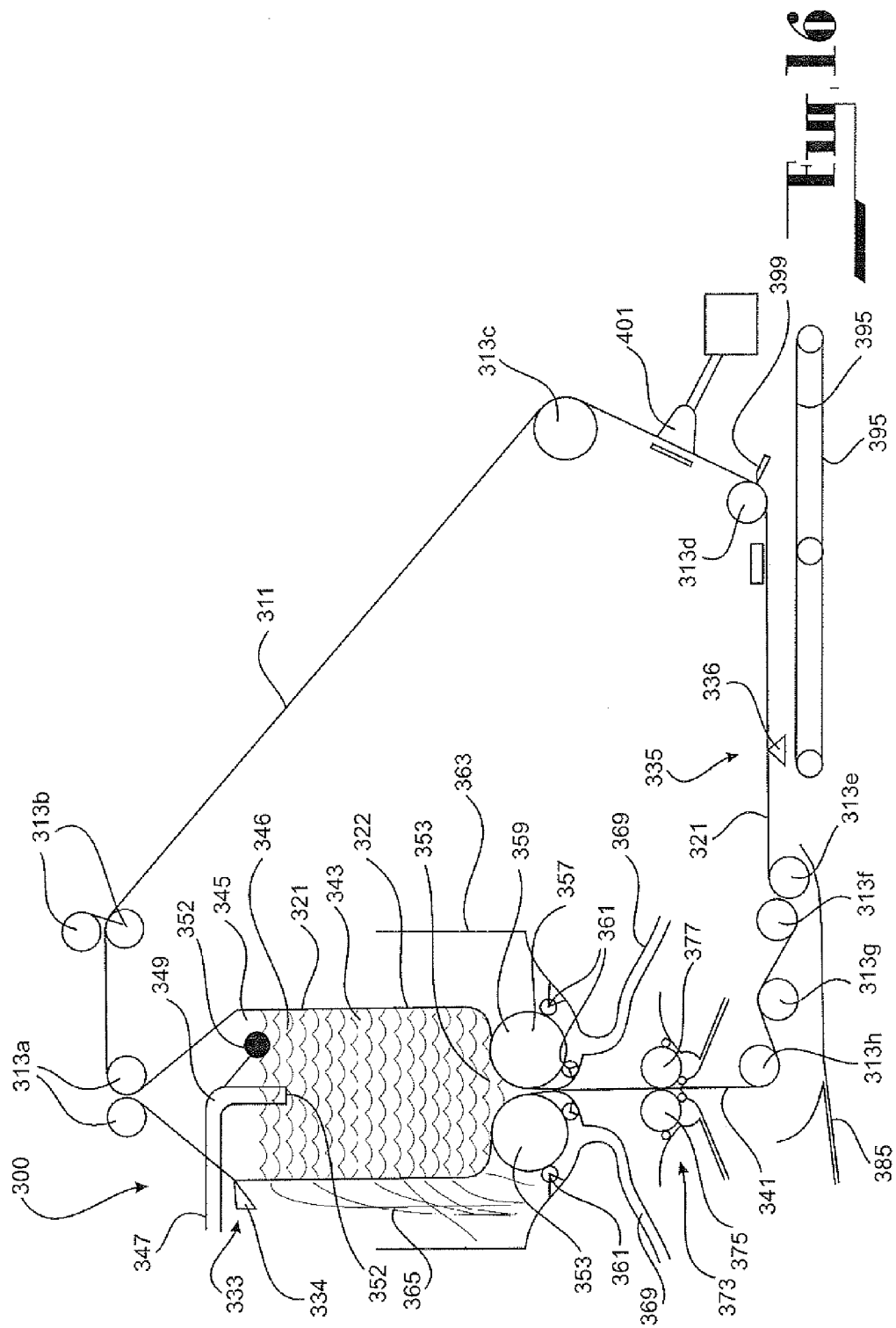

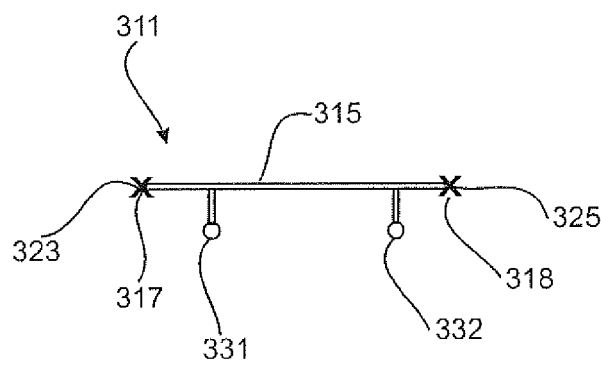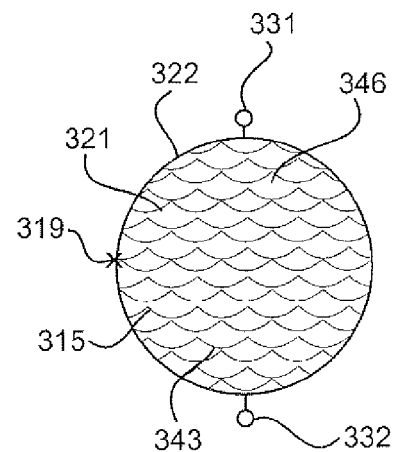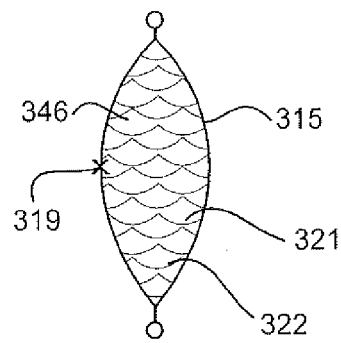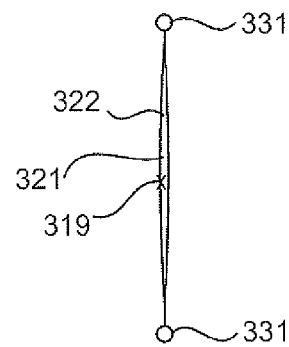

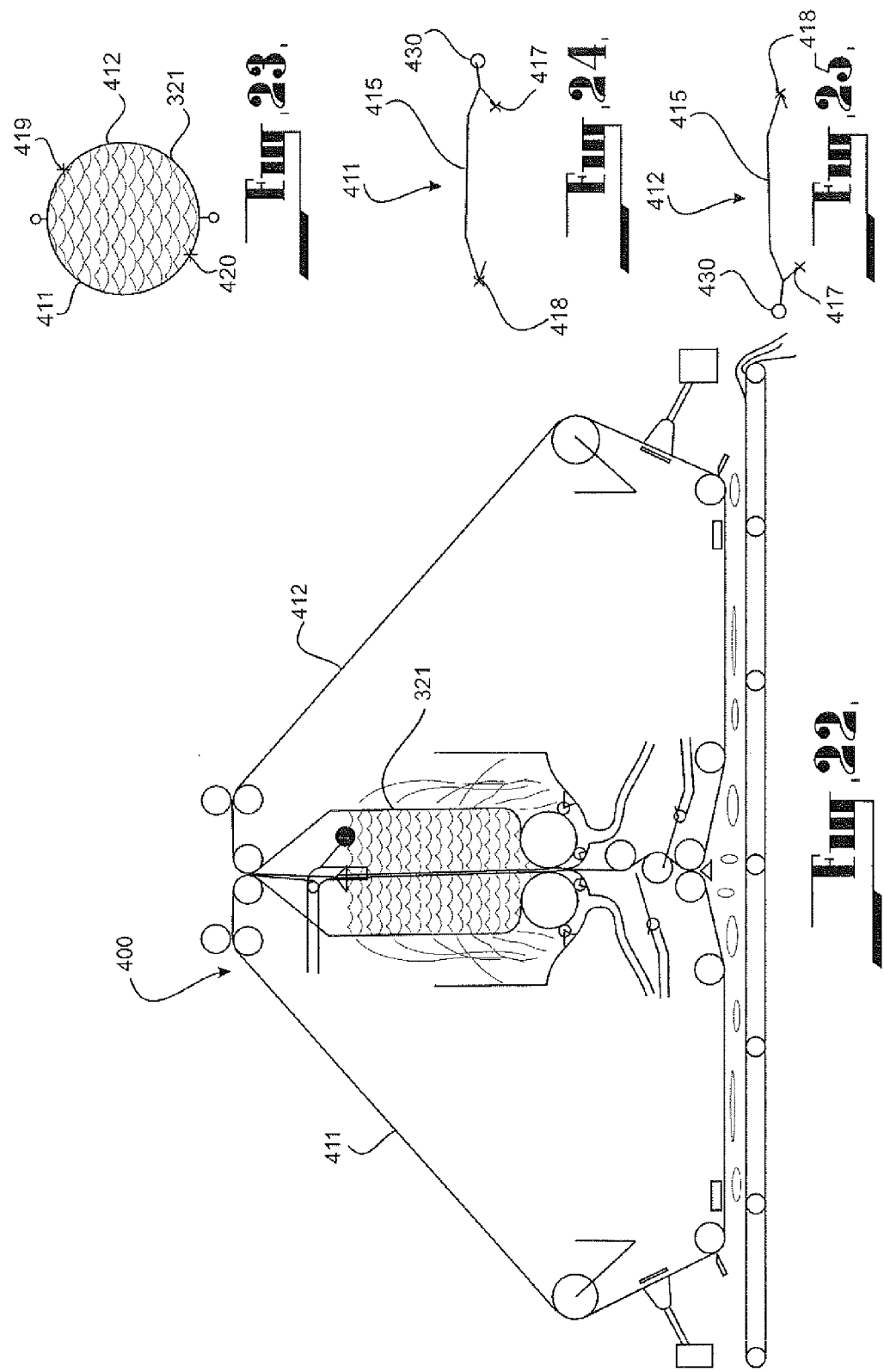

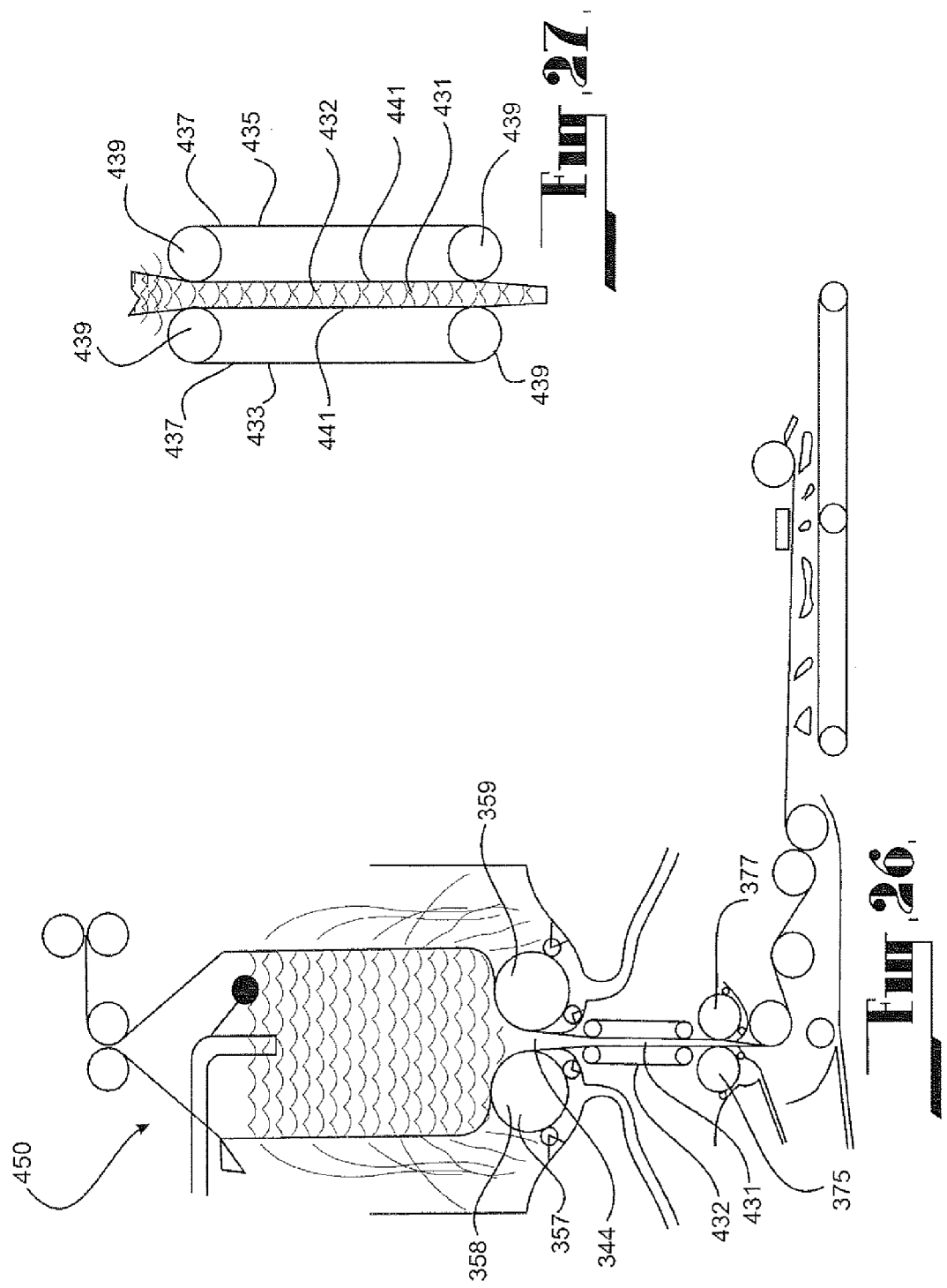

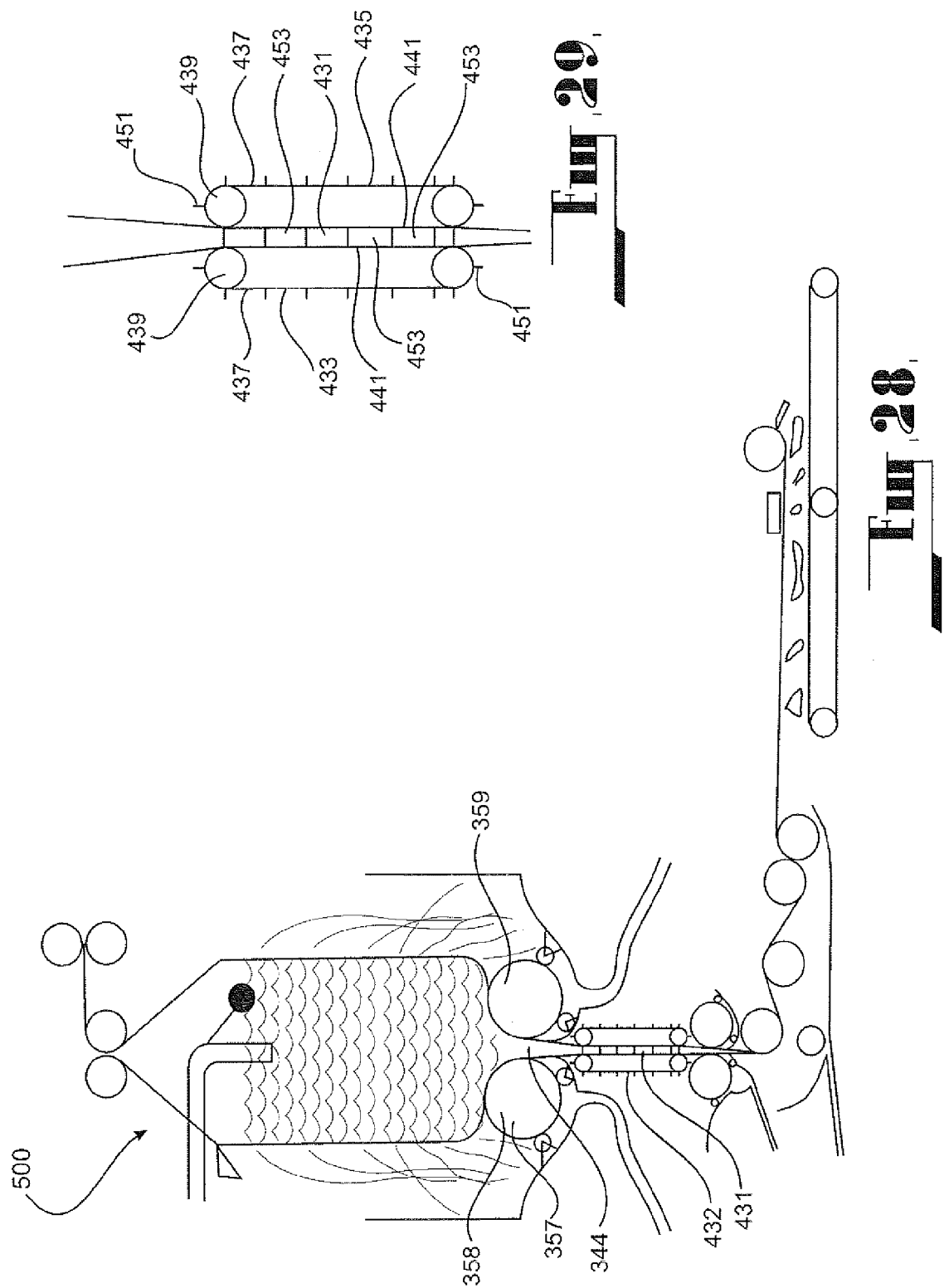

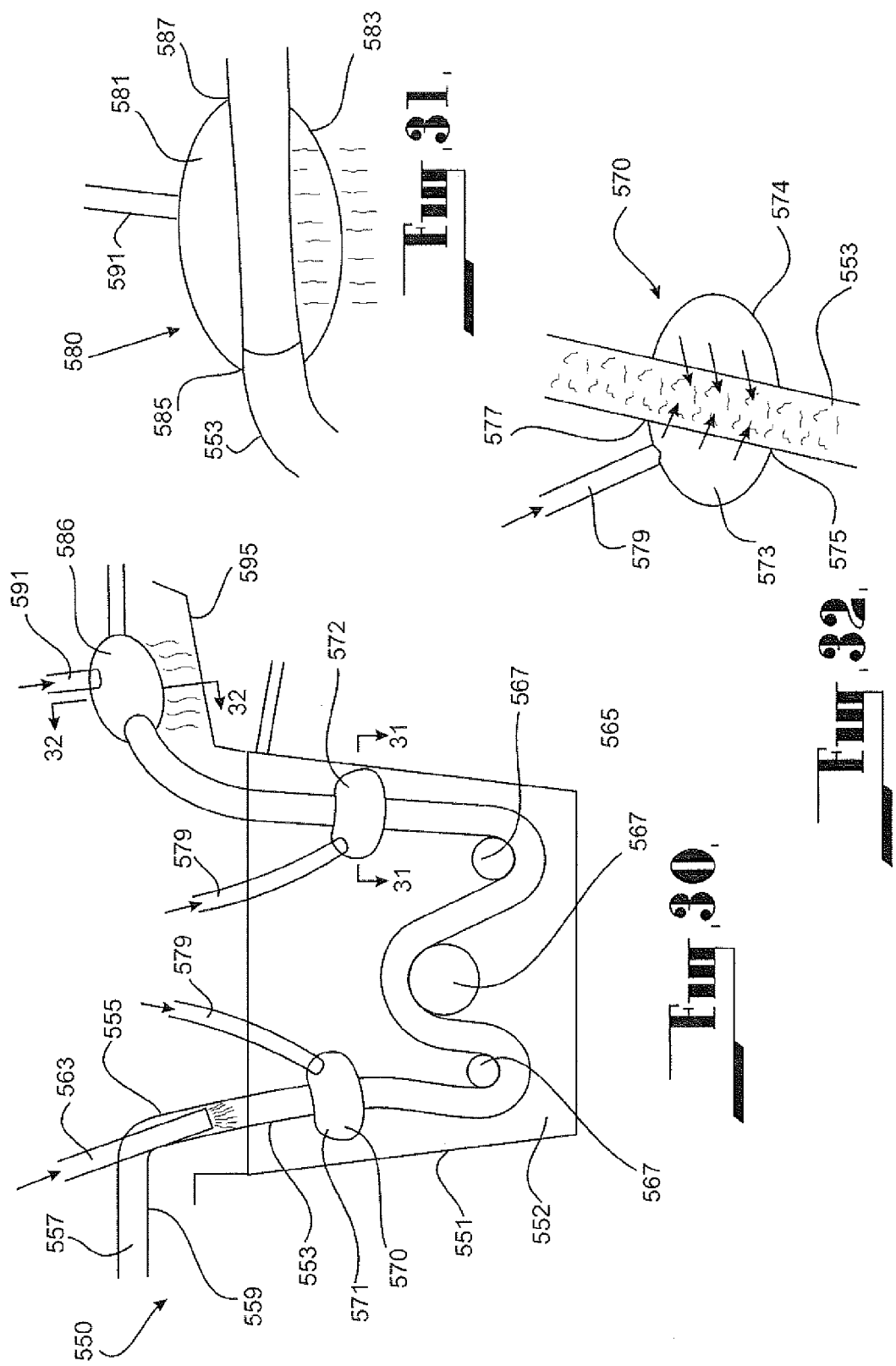

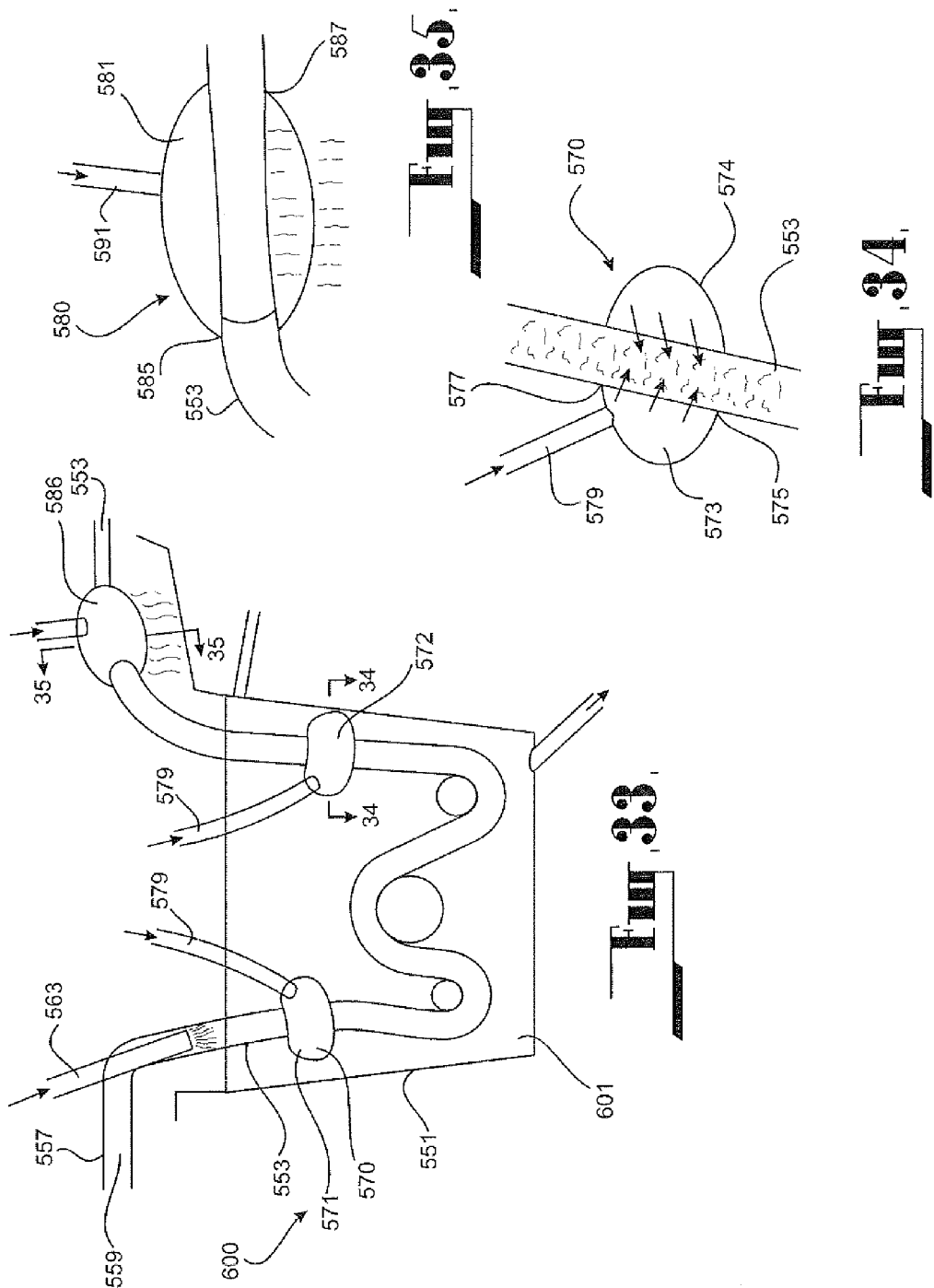

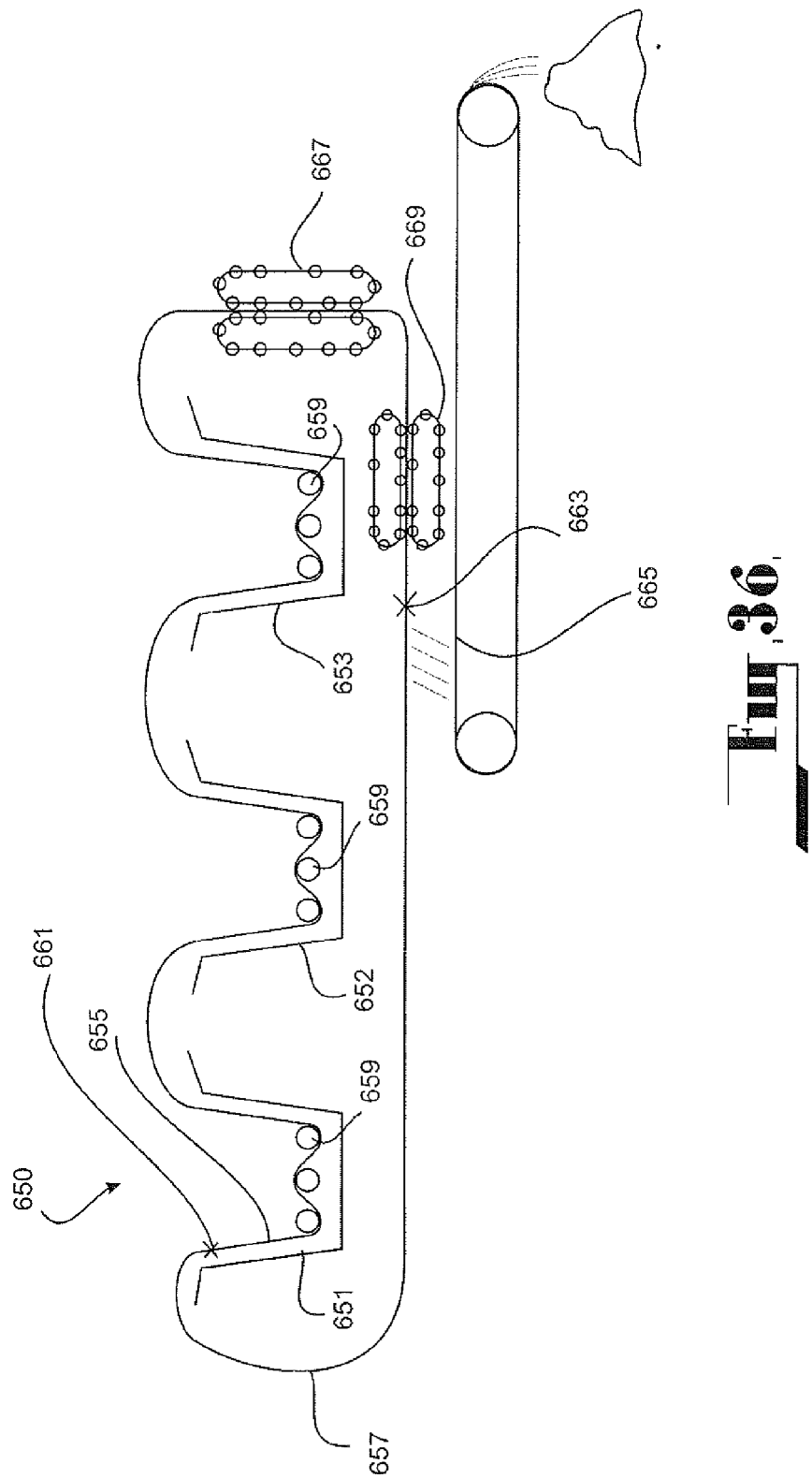

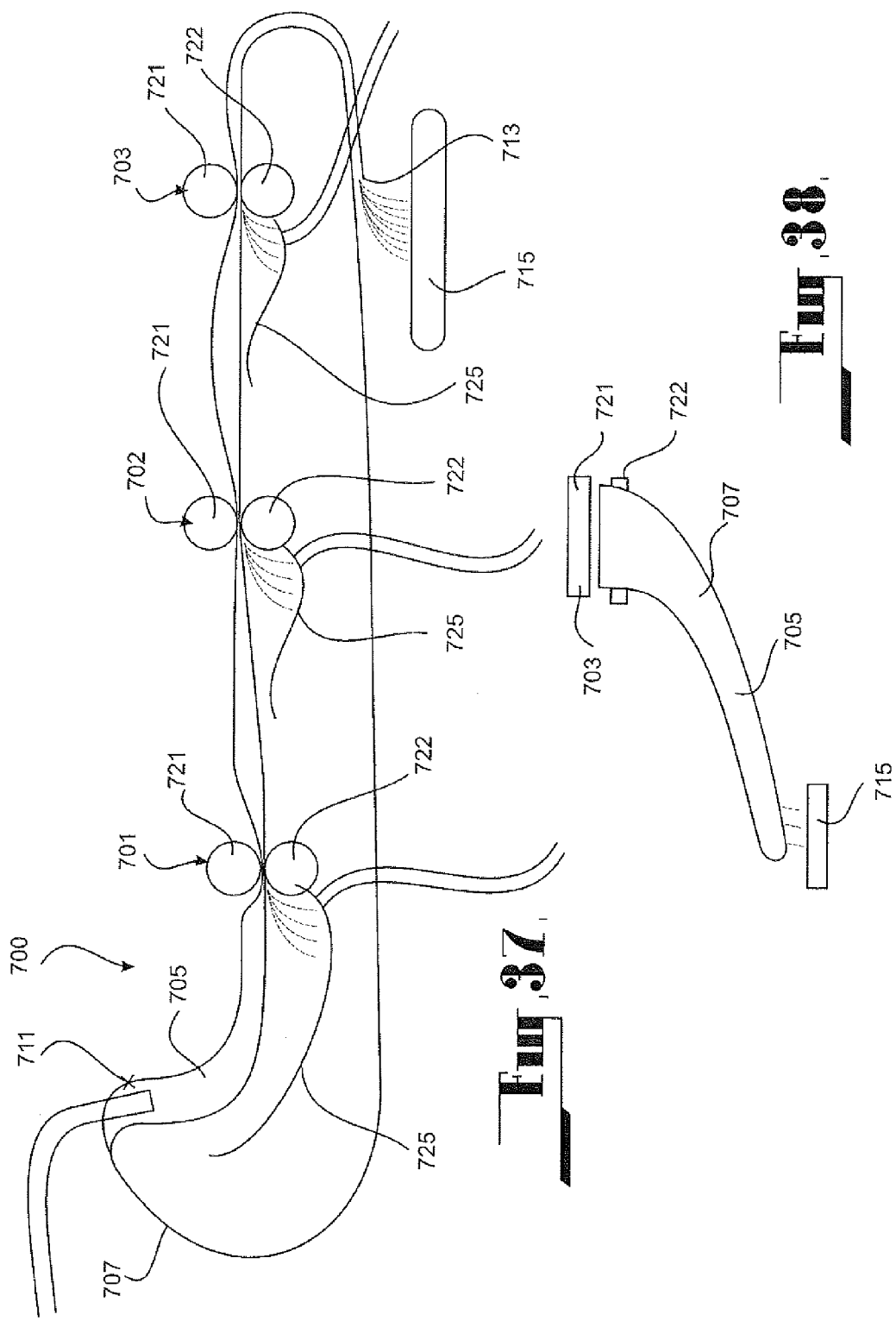

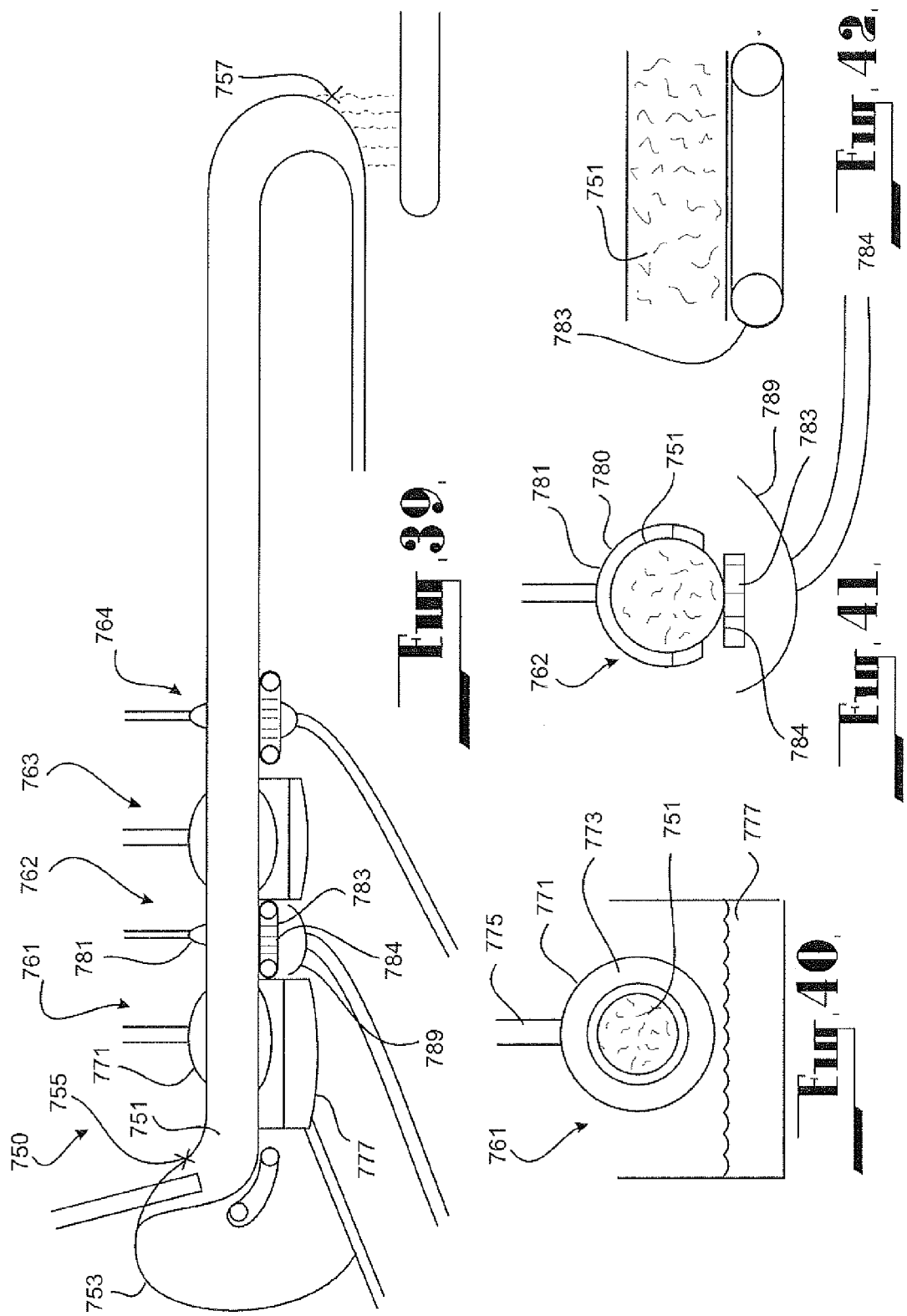

MATERIALS HANDLING AND TREATMENT

CROSS REFERENCE TO RELATED APPLICATIONS

This application is a continuation of and claims the benefit under 35 U.S.C. §120 to U.S. application Ser. No. 12/304,811 by the inventors, filed May 19, 2009, the entire contents of which are hereby incorporated herein.

BACKGROUND

1. Field of the Invention

Example embodiments in general related to an apparatus for performing an operation on a material, and also to a method of performing an operation on a material.

2. Description of Related Art

It is known to use belt filter presses for separating liquids from solid suspensions. Such filters can be employed in the treatment of sewage for dewatering purposes. Typically, a belt filter comprises two tensioned endless belts circulating around guide rollers with a pressure zone defined between the two belts. In addition to the pressure zone, the belt filter has a gravity zone where water can be drained from the matter undergoing treatment and a wedge zone where solids are prepared for presentation to the pressure zone at which the solids are subjected to pressure to extract water therefrom. At least one of the belts is formed of a water-pervious material to facilitate removal of the extracted water.

Present flat belt presses for dewatering sludge experience run off of the sludge and generally can only have 10 to 20 mm spread evenly across the belt. In an endeavour to prevent run-off, some flat belt filter presses have boards along the sides of the belt to contain the sludge. Even so, in operation, the spread of the sludge is not uniform across the belt and the entire belt is generally not used. Also there is a degree of spatter associated with the spreading of the sludge onto the belt and thus the process can be somewhat messy.

A particular problem with such belt filter presses is the difficulty in ensuring that the belts track correctly around the guide rollers, particularly at the region of the pressure zone where the belts co-operate to press the material undergoing treatment.

A recent development in relation to belt filter presses is disclosed in WO 99/07457 (Day) and is known as "V" filter. This development is an advance on the basic two-belt press in that it provides better spread of the sludge and more even distribution. Additionally, it removes the tracking problem of having more than one belt. However, it is limited in its applications to small capacity as it sags between the holding/compaction rollers which can result in stretching of the belts if over loaded. Further, it does not allow for a high hydrostatic pressure head as the liquid can only be filled to the top of the "V" bolt.

SUMMARY

An example embodiment is directed to an apparatus for performing an operation on a material. The apparatus may include one or more elongate sheets movable along a path and adapted to be releasably connected together along longitudinal edges thereof to assemble a movable tubular structure within which at least part of the operation is to be performed, at least a portion of the tubular structure being liquid permeable.

In an example, the apparatus includes a belt structure defining said one or more elongate sheets, whereby the tubular structure can be continuously assembled at one end thereof and continuously disassembled at the other end thereof during movement of the or each belt structure.

In an example, the belt structure includes an endless belt structure adapted to circulate around a path incorporating guide roller structures around which the belt structure passes.

In an example, the one or more elongate sheets are adapted to be releasably connected along longitudinal edges thereof by a slidable connector means such as a zipper. A particularly suitable slider connector means is of the type disclosed in U.S. Pat. No. 6,467,136 in the name of Neil Deryck Bray Graham, the entire contents of which are incorporated herein by way of reference.

In an example, the apparatus further includes means for introducing material on which the operation is to be performed into the tubular structure.

In an example, the apparatus further includes means for compressing the tubular structure along a portion thereof. This may be for the purpose of compacting the material, pumping the material along the tubular structure or a combination of compacting and pumping actions. The compaction may be for the purpose of expressing liquid from material contained in the tubular structure.

The means for compressing the tubular structure may include a press for mechanically compressing the tubular structure. The press may be adapted to apply a linear pressing action to the tubular structure. The press may comprises a cyclically movable structure having an inner run at one side of a pressing zone along which the tubular structure can pass to be subjected to compression. The press may also comprises a further cyclically movable structure having an inner run at the opposed side of a pressing zone, the arrangement being that the inner runs of the two cyclically movable structures cooperate to define the pressing zone. Each cyclically moveable structure may comprise two endless bands disposed in spaced apart side-by-side relation and carrying a plurality of spaced cams adapted to cooperate to subject the tubular structure to a compressive action to create alternating zones of constriction and dilation (restitution). The cams may comprise elongate rollers supported between the two endless bands to extend in a direction transverse to the direction of travel of the endless belt structure. The elongate rollers may have flexibility to partly conform to the profile of the tubular structure.

The tube structure may be subjected to a compression as it undergoes deflection in passing around one or more of the roller structures. Further, the tube structure may undergo compression as a result of tension which is exerted on the tubular structure by virtue of axial tension on the belt portion and also tension arising from the loading exerted by material contained within the tubular structure. Such compression may assist in treatment of material contained in the tubular structure. Where the treatment involves dewatering of the material, the compression may assist in squeezing water from the material.

In an example the apparatus further includes separating means for longitudinally splitting the tubular structure for discharge of matter contained therein. Such longitudinal splitting may comprise disassembly of the tubular structure.

Typically, material discharges from the belt portion after longitudinal splitting of the tubular structure by falling from the belt portion under the influence of gravity.

Removal means may be provided for removing remnant matter from the or each elongate sheet after splitting of the tubular structure. The removal means may subject the belt portion to a cleaning action which may involve scraping, washing, application of a cleaning fluid (liquid or gas) under pressure, suction or any combination of such actions.

In an example, the tubular structure is open at the assembly end thereof to receive the material on which the operation is to be performed.

The endless belt structure may comprise an elongate belt portion.

In one arrangement, there may be only one belt portion, with the longitudinal side edges thereof being adapted to be releasably connected together to form the tubular structure. In another arrangement, there may be two or more belt portions, with one longitudinal edge of each belt portion being releasably connected to an adjacent longitudinal edge of a neighbouring belt portion.

At least part of the elongate belt portion is formed of water permeable material. Typically, the belt portion is formed entirely of the water permeable material.

The belt portion may include two interconnected longitudinal sections, with one longitudinal section being split to provide the two longitudinal edges. Where the treatment involves dewatering of the material, the permeable nature of the belt portion allows the water to discharge from the tubular structure.

The endless belt may further comprise two endless funicular elements connected to the belt portion, the funicular elements being adapted to support the belt portion therebetween. The funicular elements may be of any appropriate form, such as, for example, bolt ropes, cables or drive transmission chains.

Each roller structure may include two wheels each having an outer periphery configured to guidingly receive a respective one of the funicular elements. In the arrangement where the funicular elements comprise ropes or cables, the outer periphery of each wheel may be configured as a rim having peripheral groove for receiving a respective one of the funicular elements. In the arrangement where the funicular elements comprise drive transmission chains, the wheels may comprise sprockets having teeth at their outer peripheries for engaging the chains.

In an example, means are provided for urging the funicular elements outwards away from each other at stages where the tubular structure is subjected to compression. This is to ensure that the compressed tubular structure maintain a taut conditions without folds, creases and wrinkles. The presence of folds, creases or wrinkles can be problematic in relation to uniform compression of the confined material.

Another example embodiment is directed to an apparatus for treating a material to separate solid and liquid components thereof. The apparatus includes one or more elongate sheets adapted to be sealingly and releasably connected along longitudinal edge portions thereof to assemble a tubular structure having a liquid permeable side wall, means for introducing material to be treated into the tubular structure, and means for progressively compressing the tubular structure along a length thereof to express liquid from material contained in the tubular structure.

Another example embodiment is directed to an apparatus for treating a material to separate solid and liquid components thereof. The apparatus includes a tubular structure having a liquid permeable flexible side wall, the tubular structure defining a chamber portion, with one end of the chamber portion being open to receive material to undergo treatment the tubular structure being confined at the other end of the chamber portion to impede liquid flow therethrough. The confinement of the tubular structure is provided by laterally inward collapsing of the flexible side wall to reduce the cross-sectional area bounded by the side wall and thereby press material contained between the collapsing side wall to form the tubular structure.

Another example embodiment is directed to an apparatus for transporting a material between two locations. The apparatus includes an endless belt structure movable around a path incorporating at least one roller structure. The endless belt structure includes an endless belt portion adapted to be assembled into a tubular structure extending between the two locations, material for transportation being introduced into one end of the tubular structure for transport therealong and the transported material being discharged from the other end of the tubular structure. The endless belt structure further includes two endless funicular elements connected to the belt portion, the funicular elements being adapted to support the belt portion there between. The roller structure includes two wheels each having an outer periphery configured to guidingly receive a respective one of the funicular elements.

Another example embodiment is directed to an apparatus comprising an endless belt structure movable around a path incorporating at least one roller structure, the endless belt structure including an endless belt portion having longitudinal edges adapted to be releasably connected to assemble a movable tubular structure, whereby the tubular structure can be continuously assembled at one end thereof and continuously disassembled at the other end thereof during movement of the endless belt structure. The endless belt structure further includes two endless funicular elements connected to the belt portion, the funicular elements being adapted to support the belt portion there between. The roller structure includes two wheels each having an outer periphery configured to guidingly receive a respective one of the funicular elements Another example embodiment is directed to an apparatus comprising an endless belt structure movable around a path incorporating at least one roller structure, the endless belt structure includes an endless belt portion adapted to be assembled into a movable tubular structure, whereby the tubular structure can be continuously assembled at one end thereof and continuously disassembled at the other end thereof during movement of the endless belt structure. The endless belt structure further includes two endless funicular elements connected to the belt portion, the funicular elements being adapted to support the belt portion there between. The roller structure includes two wheels each having an outer periphery configured to guidingly receive a respective one of the funicular elements.

Another example embodiment is directed to a method of treating a material to separate solid and liquid components thereof. The method includes providing one or more flexible belts each movable around an endless path, releasably connecting the one or more belts along longitudinal edges thereof to form a tubular structure having a liquid permeable side wall, collapsing the lower portion of the tubular structure to compress matter therein to express liquid therefrom, and releasing the connection between the longitudinal edges of the one or more endless belts to expose solid matter confined therein for removal.

DESCRIPTION OF THE DRAWINGS

Example embodiments of the present invention will be better understood by reference to the following description of several specific embodiments thereof as shown in the accompanying drawings.

FIG. 2 is a schematic cross-sectional view of an endless belt structure forming part of the apparatus of FIG. 1, the belt structure having a belt portion in an open condition.

FIG. 3 is a view similar to FIG. 2, with the exception that the belt portion is in a closed condition to form a tubular structure.

FIG. 4 is a schematic cross-sectional view along line 4-4 of FIG. 1.

FIG. 5 is a schematic cross-sectional view along line 5-5 of FIG. 1.

FIG. 6 is a schematic cross-sectional view along line 6-6 of FIG. 1.

FIG. 7 is a schematic cross-sectional view along line 7-7 of FIG. 1.

FIG. 8 is a schematic cross-sectional view along line 8-8 of FIG. 1.

FIG. 9 is a schematic cross-sectional view of the endless belt structure and a first guide element.

FIG. 10 is a schematic cross-sectional view of the endless belt structure and a second guide element.

FIG. 11 is a schematic cross-sectional view of the endless belt structure and a washing station associated therewith.

FIG. 12 is a schematic elevational view of apparatus according to a second embodiment.

FIG. 14 is a schematic elevational view of apparatus according to a third embodiment.

FIG. 15 is a schematic side elevational view of a pressing structure forming part of the apparatus of FIG. 14.

FIG. 16 is a schematic elevational view of apparatus according to a fourth embodiment.

FIG. 18 is a schematic cross-sectional view of an endless belt structure forming part of the apparatus of FIG. 16, the belt structure having a belt portion in an open condition.

FIG. 19 is a view similar to FIG. 18, with the exception that the belt portion is in a closed condition to form a tubular structure.

FIG. 20 is a view similar to FIG. 19, with the exception that the tubular structure is viewed at another location along the length thereof at which it has undergone lateral compression.

FIG. 21 is a view similar to FIG. 20, with the exception that the tubular structure is viewed at still another location along the length thereof at which it has undergone further lateral compression.

FIG. 22 is a schematic elevational view of apparatus according to a fifth embodiment.

FIG. 23 is a cross-sectional view of a tubular structure within the apparatus of FIG. 22.

FIG. 24 is a schematic cross-sectional view of one section of an endless belt portion forming part of the apparatus of FIG. 23.

FIG. 25 is a schematic cross-sectional view of another section of an endless belt portion forming part of the apparatus of FIG. 23.

FIG. 26 is a fragmentary elevational view of apparatus according to a sixth embodiment.

FIG. 27 is a schematic view of a press forming part of the apparatus of FIG. 26.

FIG. 28 is a fragmentary elevational view of apparatus according to a seventh embodiment.

FIG. 29 is a schematic elevational view of a press forming part of the apparatus of FIG. 28.

FIG. 30 is a schematic elevational view of apparatus according to an eighth embodiment.

FIG. 31 is a section on line 31-31 of FIG. 30.

FIG. 32 is a section on line 32-32 of FIG. 30.

FIG. 33 is a schematic elevational view of apparatus according to a ninth embodiment.

FIG. 34 is a section on line 34-34 of FIG. 30.

FIG. 35 is a section on line 35-35 of FIG. 33.

FIG. 36 is a schematic elevational view of apparatus according to a tenth embodiment.

FIG. 37 is a schematic elevational view of apparatus according to an eleventh embodiment.

FIG. 38 is an end view of FIG. 37.

FIG. 39 is a schematic elevational view of apparatus according to a twelfth embodiment, incorporating a series of treatment zones.

FIG. 40 is cross-section of part of FIG. 39 showing the first treatment stage.

FIG. 41 is cross-section of part of FIG. 39 showing the second treatment stage.

FIG. 42 is a sectional side view of the second treatment stage.

DETAILED DESCRIPTION

Figure 1:
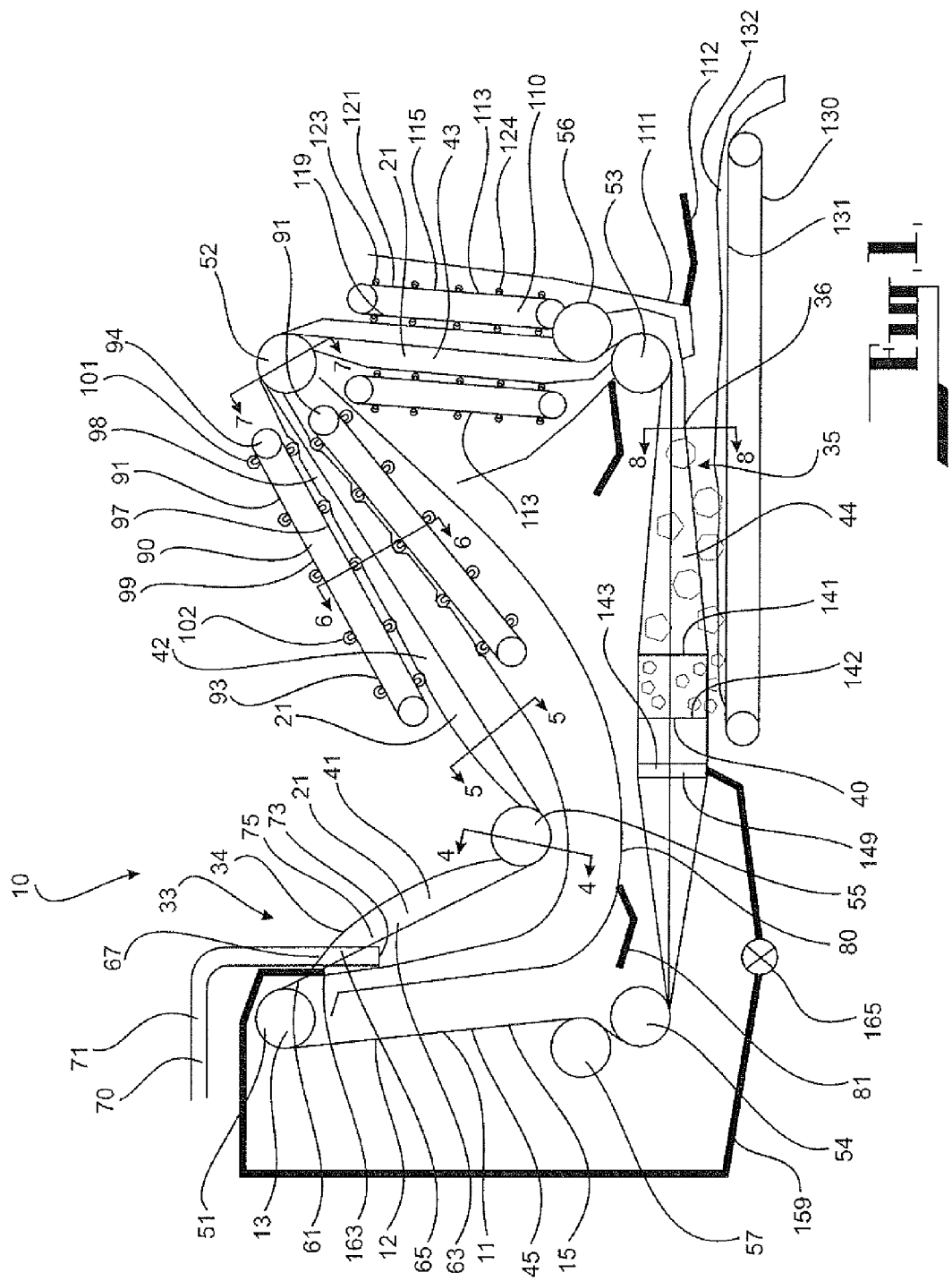
FIG. 1 is a schematic elevational view of apparatus according to a first embodiment.

As described hereafter, example embodiments are directed to an apparatus and method for performing an operation on a material. The operation may be a handling and/or treatment operation of any appropriate type including, for example, a conveying operation in which the material is transported from one location to another, a crushing operation, a filtering operation in which the material is separated into liquid and solid components, or any combination of two or more of such operations.

The apparatus has been devised particularly, although not solely, for crushing and filtering (dewatering) a water-laden sludge such as, for example, sewage, mining concentrates, mining wastes, ores, coal fines, tailings, wood pulp, paper pulp, agricultural products, wine grape mash/pulp, as well as separation of clays for brick manufacture, water filtration (for example, desalination of water), and filtration for aquaculture.

In addition to providing a means of conveyance for performing a transporting operation, the apparatus may provide a controlled means of crushing material and containing the crushings, resulting in the production of pulp. Additionally, the apparatus may provide a container to transport sludge or other material from one process bath to another.

The first embodiment, which is shown in FIGS. 1 to 11 of the drawings, is directed to a belt filter apparatus 10 for treating material to separate solid and liquid components thereof. The apparatus 10 according to this embodiment has been devised particularly for treating sludge material such as sewage for the purposes of dewatering the sludge material to facilitate recovery of the solid matter for subsequent treatment. There may, of course, be various other applications for the belt filter apparatus 10.

The apparatus 10 comprises an endless belt structure 11 adapted to circulate around a path 12 incorporating guide roller structures 13 around which the belt structure passes.

The endless belt structure 11 comprises an elongate belt portion 15 formed of sheet material; specifically, water permeable sheet material, such as for example a flexible filter pad material such as woven polypropylene. The belt portion 15 comprises two opposed longitudinal edges 17, 18. The belt portion 15 further comprises two interconnected longitudinal sections 16a, 16b, with longitudinal section 16b being split to provide the two longitudinal edges 17, 18. The belt portion 15 has an inner surface 15a defined by the confronting longitudinal sections 16a, 16b.

The endless belt structure 11 further comprises a connection means 19 for releasably connecting the two longitudinal edges 17, 18 of the belt portion 15 together so as to form a tubular structure 21 having a flexible side wall 22. The elongate cavity enclosed by the tubular structure 21 is bounded by the inner surface 15a of the belt portion 15.

The connection means 19 comprises a slider connector means in the form of a zipper. A particularly suitable slider connector means is the type disclosed in U.S. Pat. No. 6,467,136 in the name of Neil Deryck Bray Graham, the contents of which are incorporated herein by way of reference. In the arrangement shown, the slider connector means 19 comprises a male connector 23 provided along longitudinal edge 17 and a complimentary female connector 25 provided along longitudinal edge 18.

The endless belt structure 11 further comprises two endless funicular elements 31, 32 connected to the belt portion 15. The funicular elements 31, 32 are adapted to support the belt portion 15 therebetween. The funicular elements 31, 32 may be of any appropriate form, such as, for example, bolt ropes, cables or drive transmission chains.

The funicular elements 31, 32 engage the roller structures 13, as will be explained later.

The belt portion 15 is connected to the two funicular elements 31, 32 to be supported therebetween by connecting portions 27. In the arrangement shown, each connecting portion 27 comprises a flexible connection strip 28 extending laterally between the belt portion 15 and the respective funicular element and also extending longitudinally with respect thereto. The connection strip 28 is connected to the belt portion 15 at the adjacent junction 29 between the longitudinal sections 16a, 16b thereof. Each connecting portion 27 may, of course, take any other appropriate form, one example of which comprises a plurality of connecting elements spaced at intervals along the marginal area between the belt portion 15 and the respective funicular element 31, 32. With such an arrangement, the spacings between the connecting elements would accommodate movement of the connecting portion about the roller structures 13.

The roller structures 13 can be supported on a floating suspension system to ensure proper tracking of the endless belt 11 around the roller structures 13.

Each roller structure 13 comprises two wheels 14 supported on a shaft 16. Each wheel 14 has an outer periphery 14a configured to guidingly receive a respective one of the funicular elements 31, 32. In the arrangement where the funicular elements 31, 32 comprise ropes or cables, the outer peripheries 14a may be configured as rims having peripheral grooves in which the funicular elements are received. In the arrangement where the funicular elements 31, 32 comprise drive transmission chains, the wheels 14 may comprise sprockets having teeth at outer peripheries 14a for engaging the chains.

The circulating path 12 includes an assembly zone 33 at which the longitudinal edges 17, 18 of the belt portion 15 are brought together and interconnected by way of the connection means 19 to form the tubular structure 21, and a disassembly zone 35 at which the connection means 19 is released to separate the longitudinal edges 17, 18 and the tubular structure 21 subsequently opened.

The assembly zone 33 includes a first slider 34 which operates in conjunction with the male and female connector elements 23, 25 to move them together into zipping engagement as the endless belt 11 circulates around path 12. The disassembly zone 35 includes a second slider 36 also operating in conjunction with the male and female connector elements 23, 25 to progressively pull them apart in an unzipping action as the endless belt 11 circulates around path 12. With this arrangement, the longitudinal edges 17, 18 of the belt portion 15 are continuously connected together at the assembly station 33, and the interconnected longitudinal edges 17, 18 are continuously separated at the disassembly zone 35 so as to split the tubular structure 21 as the endless belt 11 circulates around the path 12.

The assembly zone 33 comprises supplementary guide rollers (not shown) to progressively move the belt portion 15 from an open generally flat condition, through an arcuate condition, and to ultimately assume a closed condition at which the longitudinal edges 17, 18 are connected together by way of the connection means 19 (under the action of the first slider 34) to form the tubular structure 21. The supplementary guide rollers may comprise "V" rollers (not shown) for tensioning the belt portion 15 to maintain a generally uniform tension on the belt portion 15 as it is zipped closed.

The disassembly zone 35 comprises a guide arrangement 40 for progressively moving the belt portion 15 from the closed condition forming the tubular structure 21 to the open condition.

The path 12 around which the endless belt structure 11 circulates comprises a downwardly inclined working run 41, an upwardly inclined working run 42, a downward generally vertical run 43, a generally horizontal discharge run 44, and an upward return run 45.

The roller structures 13 incorporated in the path 12 comprises first and second upper turn rollers 51, 52, first and second lower turn rollers 53, 54 and an intermediate turn roller 55 disposed between the two upper turn rollers but at a lower level to establish the downwardly inclined working run 41 extending from first upper turn roller 51 and the upwardly inclined working run 42 extending to second upper turn roller 52. The roller structures 13 also incorporate two tensioning rollers 56, 57, one operating in conjunction with turn roller 53 and the other operating in conjunction with turn roller 54.

At least one of the roller structures 13 is adapted to be driven to move the belt structure around the path 12.

The belt portion 15 has a closed condition in which the longitudinal edges 17, 18 are interconnected to form the tubular structure, as shown schematically in FIG. 3. Otherwise, the belt portion 15 is in an open condition in which the inner surface 15a is exposed, as shown schematically in FIG. 2.

The belt portion 15 is in an open condition when the belt structure 11 passes around first upper turn roller 51; at that stage, assembly of the tube structure 21 has not yet commenced. The belt portion 15 undergoes assembly into the configuration of the tubular structure 21 as it advances through the assembly zone 33. The assembly is completed once the two longitudinal edges 17, 18 are interconnected by being zippered together by the first slider 34; at that stage the belt portion 15 is closed and forms the tubular structure 21. As the belt portion 15 progressively moves from the open condition to the closed condition, it forms an open channel portion which progressively closes upon itself until the tubular structure 21 is formed. Accordingly, the belt portion 15 in the downwardly inclined run 41 of the path 12 of the belt structure 11 comprises an upper section 61 at which the belt portion is in the open condition, a lower section 63 at which is closed to define the tubular structure 21, and an intermediate section 65 at which it is of channel configuration. The intermediate section 65 is adjacent the open upper end 67 of the tubular structure 21.

A delivery means 70 is provided for introducing sludge material into the tubular structure 21. The delivery means 70 includes a delivery pipe 71 having an outlet end 73 extending into the tubular structure 21 through the open upper end 67 thereof. The delivery pipe 71 obtains access to the open upper end 67 of the tubular structure 21 by way of the intermediate portion 65 of channel configuration. The outlet end 73 of the delivery pipe 71 is so disposed within the tubular structure 21 that it extends below the upper level of sludge material contained therein, a typical level being depicted in FIG. 1 and identified by reference numeral 75. With this arrangement, the outlet 73 is submersed in the sludge material, thereby avoiding excessive splashing of material delivered into the tubular structure 21. A float valve (not shown) is associated with the delivery means 70 to regulate delivery of sludge material into the tubular structure 21 on an on-going basis.

In the downwardly inclined working run 41, liquid within the sludge material can drain from the tubular structure 21 through the permeable side walls thereof under the influences of gravity and hydrostatic pressure of the sludge material contained therein. Similarly, liquid can drain from the tubular structure 21 through the permeable side walls thereof in the upwardly inclined working run 42 under the influences of gravity and hydrostatic pressure.

A collection structure 80 is positioned below the working runs 41, 42 for collection of liquid discharging therefrom. The collection structure 80 incorporates a discharge path 81 from which the collected liquid can be removed and delivered to another location for further processing or handling as necessary.

After passing along the downwardly inclined working run 41, the tubular structure 21 turns about the intermediate roller 55 and commences the upward vertical run 42.

The upwardly inclined working run 42 includes a pressing station 90 at which the tubular structure 21 is subjected to compression to extract further liquid from the sludge material contained therein. The liquid so extracted discharges from the tubular structure 21 through the permeable side walls thereof and drains into the collection structure 80.

The pressing station 90 is arranged to apply a linear pressing action to the portion of the tubular structure 21 passing therethrough to squeeze the tubular structure and thus extract the further liquid from the sludge material. The pressing station 90 has a press comprising two cyclically movable structures 91 each having an inner run 97 and an outer run 99. The two cyclically movable structures 91 are so positioned that the two inners runs 97 cooperate to define a pressing zone 98 along which the tubular structure 21 can pass to be subjected to compression. Each cyclically moveable structure 91 comprises two endless bands 93 passing around end rollers 94, the two bands 93 being disposed in spaced apart side-by-side relation and carrying a plurality of spaced cams 101. In the arrangement shown, the cams 101 comprise elongate rollers 102 supported between the two endless bands 93. In this way, the rollers 102 extend in a direction transverse to the direction of travel of the endless belt structure 11. The cams 101 on the inner runs 97 cooperate to subject the tubular structure 21 to a compressive action to create alternating zones of constriction and dilation (restitution). The pressing structures 91 are so arranged that the spacing between the inner runs 97 progressively decreases in the direction of movement of the tubular structure 21, thereby progressively narrowing the pressing zone 98 to progressively increase the compressive effect on the tubular structure.

In addition to applying compressive force to the tubular structure 21, the cams 101 serve to urge sludge material contained within the tubular structure to advance upwardly with the moving tubular structure rather than migrating downwardly within the tubular structure under the influence of gravity and impeding the dewatering process.

In one arrangement, the structures 91 may be externally powered in the sense that a driving force is applied to them to cause them to undergo cyclical movement. This may, for example, be achieved by driving one or both of the end rollers 95. Such an arrangement may be advantageous in assisting movement of the endless belt structure 13 around its path 12. Additionally, if the speed of movement of the inner runs 97 is different from that of the tubular structure 21 passing therebetween, the inner runs 97 may subject the tubular structure 21 to a peristaltic action to crate alternate waves of constriction and restitution.

In another arrangement, the structures 91 may be freewheeling in the sense that no separate driving force is applied to them and they undergo cyclical movement merely in response to interaction with the moving tubular structure 21.

After passing along the upwardly inclined working run 42, the tubular structure 21 turns about the second upper roller 52 and commences the downward generally vertical run 43.

The downward working run 43 includes a pressing station 110 at which the tubular structure 21 is compressed to extract any available remnant liquid therefrom. The liquid so extracted discharges from the tubular structure 21 through the permeable side walls thereof and drains into a collection structure 111. The collection structure 111 incorporates discharge paths 112 from which the collected liquid can be removed and delivered to another location for further processing or handling as necessary The pressing station 110 is arranged to apply a linear pressing action to the portion of the tubular structure 21 passing therethrough to squeeze the tubular structure and thus extract any available remnant liquid from the sludge material contained therein.

The pressing station 110 has a press comprising two cyclically movable structures 113 each having an inner run 119 and an outer run 121. The two cyclically movable structures 113 are so positioned that the two inners runs 119 cooperate to define a pressing zone 118 along which the tubular structure 21 can pass to be subjected to compression.

Each cyclically moveable structure 113 comprises two endless bands 115 disposed in spaced apart side-by-side relation and carrying a plurality of spaced cams 123. In the arrangement shown, the cams 123 comprise elongate rollers 124 supported between the two endless bands 115. In this way, the rollers 124 extend in a direction transverse to the direction of travel of the endless belt structure 11. The cams 123 on the inner runs 119 cooperate to subject the tubular structure 21 to a compressive action to create alternating zones of constriction and dilation (restitution). At lease some of the rollers 124 may be flexible in order to conform to the profile of that portion of the tubular structure 21 with which they are in contact.

As was the case with the two cyclically movable structures 91 of pressing station 90, the two cyclically movable structures 113 may be driven so as to undergo cyclical movement independently of the moving tubular structure or may be arranged to move cyclically under the influence of the movement of the tubular structure 21. In one arrangement, two cyclically moveable structures 113 may travel in a direction in which their inner runs 119 move in the same direction as the moving tubular structure 21. Further, the inner runs 119 may move at the same speed as the moving tubular structure or alternatively at a different speed. Where the inner runs 119 move at a speed different from the speed of the tubular structure 21, an enhanced compressive action can be achieved in order to compact the material contained within the tubular structure. In moving relative to the tubular structure 21, the inner runs 119 may move at a faster rate or a slower rate in comparison thereto. In another arrangement, the two cyclically moveable structures 113 may be driven in a direction such that the inner runs 119 move counter to the direction of movement of the tubular structure 21. With this arrangement, a more robust compaction action can be applied to the material contained within the tubular structure 21.

In addition to compression established by the pressing stations 90, 110, the tube structure 21 can also be subjected to a degree of compression as it undergoes deflection in passing around the intermediate roller structure 55 and the second upper roller structure 52. Further, the tube structure 21 can undergo compression as a result of tension which is exerted on the tubular structure 21 by virtue of axial tension on the belt portion 15 and also tension arising from the loading exerted by the sludge material contained within the tubular structure 21.

After passing along the generally vertical working run 43, the tubular structure 21 turns about the first lower turn roller 53 and commences the horizontal discharge run 44 with the longitudinal 16b of the belt portion 15 on the underside. Tensioning roller 56 cooperates with turn roller 53 to maintain tension on the circulating belt structure 11.

The discharge run 44 includes the disassembly zone 35 at which the connection means 19 is released to separate the longitudinal edges 17, 18 of the tubular structure 21 and at which the tubular structure 21 subsequently opened. The interconnected longitudinal edges 17, 18 are continuously separated at the disassembly zone 35 so as to split the tubular structure 21 as the endless belt 11 circulates around the path 12 and expose the inner surface 15a of the belt portion 15. Specifically, the disassembly zone 35 includes the second slider 36 which operates in conjunction with the male and female connector elements 23, 25 to progressively pull them apart in an unzipping action as the endless belt structure 11 circulates around path 12. Further, the disassembly zone 35 includes the guide arrangement 40 for progressively moving the belt portion 15 from the closed condition forming the tubular structure 21 to the condition in which it is open such that the inner surface 15a of the belt portion 15 is exposed.

At this stage, longitudinal sections 16b of the belt portion 15, which incorporates the two longitudinal edges 17, 18, is on the underside. As the belt portion 15 opens, dewatered sludge material falls from the circulating belt structure 11.

A collection zone 130 is provided for receiving dewatered sludge material falling from the belt portion 15 as it opens from the tubular structure 21. In the arrangement shown, the collection zone 130 comprises a belt conveyor 131 which transfers the collected sludge material to another location for subsequent processing. In FIG. 1, the collected sludge material is denoted by reference numeral 133 and is depicted schematically discharging from one end of the conveyor 131.

The guide arrangement 40 acts to progressively unfurl the belt portion 15 from the closed condition forming the tubular structure 21 to the condition in which it is open. The guide arrangement 40 comprises a series of profiled guide elements 140 over which the belt portion 15 passes. In the arrangement shown, the guide elements 140 comprise three guide elements 141, 142 and 143. Each guide element 140 presents a surface 145 for sliding contact with the inner surface 15a of the belt portion 15. The guide arrangement 40 is such that the belt portion 15 is maintained in a taut condition as is unfurls from the closed condition to the open condition, thereby avoiding fold or wrinkles in the unfurling belt portion 15.

The first and second guide elements 141, 142 function as scrapers 147 for scraping the inner surface 15a of the belt portion 15 to assist in removal of any remnant sludge matter therefrom.

The discharge run 44 also includes a washing station 149 associated with the third guide element 143. The washing station 149 comprises a spray system 150 for spraying a washing fluid such as water onto the belt portion 15 from the outer side thereof. The spray system 150 comprises an overhead spray bar 151 and two side spray bars 153 each arranged to spray washing fluid onto the belt portion 15. The spray can penetrate the permeable side walls of the belt portion 15, so cleaning the inner surface 15a thereof. A collection structure 155 is provided for collecting the spent spray and any sludge matter removed as it drains from the belt portion 15. The collected washing fluid and any accompanying sludge material can be returned to the belt structure 11 for further processing. For this purposes, the collection structure 111 comprises a catchment portion 157 below the spray system 150 and a recirculating line 159 having an intake end 161 communicating with the catchment portion 157 and a discharge end 163 communicating with the open top of the tubular structure 21 in the run 41 thereof. A recirculating pump 165 is incorporated in the recirculating line 159.

After passing along the discharge run 44, the belt structure 11, with the belt portion 15 now in an open condition, turns about the second lower turn roller 54 and commences the return run 45. Tensioning roller 57 cooperates with turn roller 54 to maintain tension on the circulating belt structure) 1.

Although not shown in the drawings, means are provided for urging the funicular elements 31, 32 away from each other at stages where the tubular structure 21 is undergoing compression. This is to ensure that the compressed tubular structure 21 assumes a taut condition without folds, creases or wrinkles. The presence of folds, creases or wrinkles can be problematic in relation to uniform compression of the material confined within the tubular structure.

The outward movement of the funicular elements 31, 32 at stages where the tubular structure 31 undergoes compression can be seen in FIG. 6 of the drawings when compared to FIGS. 4 and 5. In FIG. 6, the tubular structure 21 is shown moving through pressing station 9. As a result of compression, the tubular structure 21 is caused to deflect laterally and it is necessary for the funicular elements 31, 32 to move outwardly away from each other to accommodate the lateral spreading of the tubular structure 21. If the funicular elements 31, 32 do not move outwardly away from each other to accommodate the lateral spreading of the tubular structure 21, the side wall 22 thereof is likely to develop folds, creases and/or wrinkles.

The means for urging the funicular elements 31, 32 away from each other may comprise spring or tensioning devices adapted to engage the funicular elements on the runs thereof at the stages where the tubular structure is adapted to be compressed.

From the foregoing, it is evident that the first embodiment provides a simple yet highly effective belt filter apparatus 10 for separating solid and liquid components in a material such as sewage undergoing treatment. The separation involves a first filtering stage during the first run 41, whereby liquid (water) drains under the influences of gravity and hydrostatic pressure from the a lower section 63 of the belt portion 15 which is closed to define the tubular structure 21. Compression of the lower section 63 arising from axial tension on that lower section assists in squeezing the sludge material to release the liquid. Liquid within the lower section 63 can drain therefrom through the liquid permeable side wall, spreading evenly around the periphery of the tubular structure. This is caused and enhanced by the hydrostatic pressure generated by the column of liquid moving through the permeable side wall of tubular structure, drawing the sludge material with it to the side wall. The sludge material spreads evenly on the side wall because the liquid flows to points of low density/resistance and avoids points of high density/resistance. In this way, an even layer of sludge is deposited around the side wall of the portion of the tubular structure defined by the lower section 63 of the belt portion 15 along the first run 41. Once deposited, the sludge material is evenly compacted by the hydrostatic pressure of the liquid behind it, forcing the sludge against the side wall of the tubular structure 21. The separation also involves a second filtering stage during the second run 42, whereby liquid (water) can also drain under the influences of gravity and hydrostatic pressure from the tubular structure 21. Axial tension in the tubular structure contributes to some lateral compression thereof to assist in releasing the liquid. The second run 42 also involves compression of the tubular structure 21 at pressing station 90 to extract further liquid from the sludge material contained in the tubular structure 21. The separation further involves a third filtering stage during the third run 43 which involves compression of the tubular structure 21 at pressing station 110 to extract any retrievable remnant liquid from the sludge material contained in the tubular structure 21. The dewatered sludge material is then discharged along the fourth run 44 and collected. The collected material may be subjected to further processing if required.

Because of the configuration of the various runs in the circulating path 12 of the belt structure 11, the effect of gravity acting on the sludge material as the belt structure 11 moves downwardly in the first and third runs 41, 43 can assist in energy requirements for elevating the sludge material as the belt structure 11 moves upwardly during the third run 43.

The cyclically movable structures 91, 113 subject the tubular structure 21 to compression to create alternating zones of constriction and dilation (restitution). As explained above, this is for the purposes of compacting material confined in the tubular structure. Additionally, or alternatively, the alternating zones of constriction and dilation (restitution) may exert a pumping action on the confined material, causing it to advance within the tubular structure 21 at a difference rate to the rate at which the tubular structure moves. In certain instances, movement the tubular structure 21 may be intermittent, in which case the pumping action may cause the confined material to continue to advance within the tubular structure notwithstanding that the latter is stationary.

Figure 13:
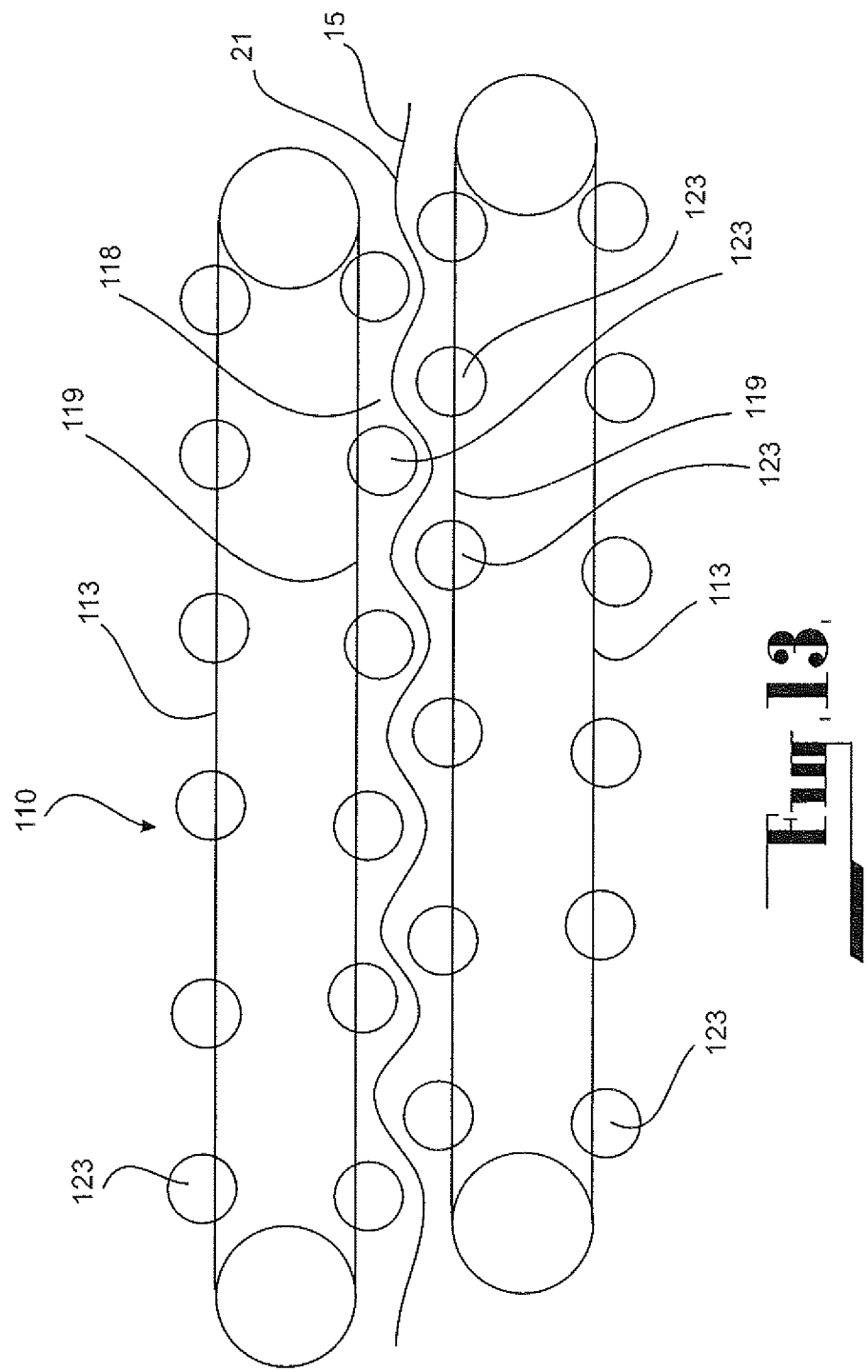
FIG. 13 is a schematic side elevational view of a pressing structure forming part of the apparatus of FIG. 12.
Figure 17:
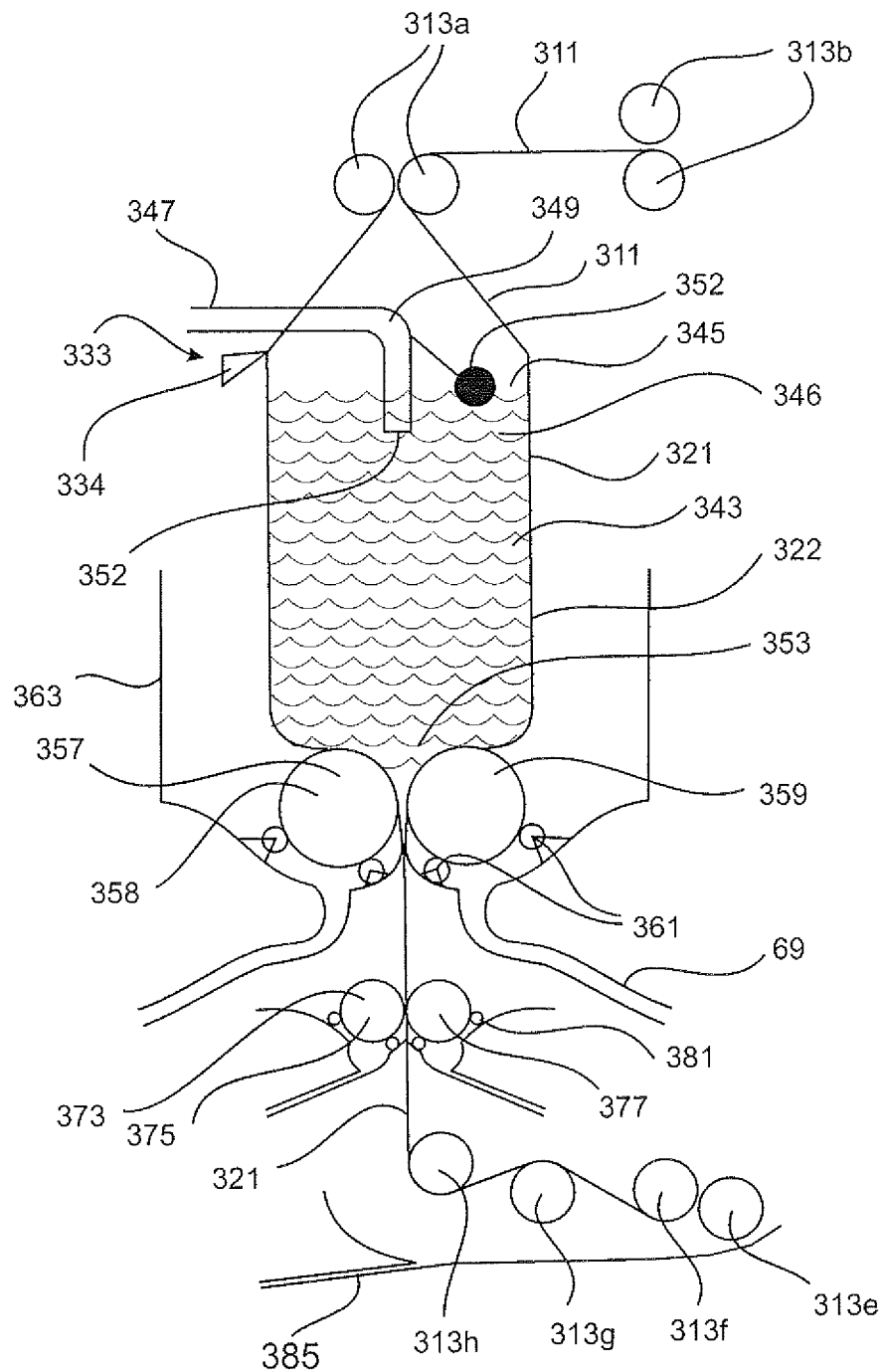
FIG. 17 is a fragmentary elevational view of the apparatus of FIG. 16.

Referring now to FIGS. 12 and 13, there is shown a belt filter apparatus 200 according to a second embodiment. This embodiment is similar in some respects to the previous embodiment and similar reference numerals are used to denote corresponding parts.

In this embodiment, the tubular structure 21 turns about two turn rollers 201 in moving between the first run 41 and the second run 42. The two rollers 201 are spaced apart and a section 203 of the tubular portion 21 draped therebetween.

The belt filter apparatus 200 includes two pressing stations 90, 110 as was the case with the previous embodiment. However, in this embodiment, the second pressing station 110 is arranged along a horizontal run 205 of the belt structure 11 rather than a vertical run. Further, at the pressing station 110, the cams 123 on opposed sides of the tubular structure 21 locate between each other to subject the tubular structure 21 to a peristaltic pressing action, as best seen in FIG. 13. The pressing station 110 comprises the two cyclically movable structures 113 on opposed sides of the horizontal run 205. The cams 123 on the two inner runs 119 are in an offset relationship such that one cam of one inner run 119 aligns with the spacing between adjacent cams on the other run. With this arrangement, the tubular structure 21 is subjected to the peristaltic pressing action between the interacting cams 123.

The discharge run 44 of the apparatus 200 is located below the horizontal run 205 and the second pressing station 110 associated therewith.

Referring now to FIGS. 14 and 15, there is shown a belt filter apparatus 250 according to a third embodiment. This embodiment is similar in some respects to the first embodiment and similar reference numerals are used to denote corresponding parts.

In this embodiment, the tubular structure 21 turns about two turn rollers 251 in moving between the first run 41 and the second run 42. The two rollers 251 are spaced apart and a section 253 of the tubular portion 21 draped therebetween.

The belt filter apparatus 250 includes two pressing stations 90, 110 as was the case with the first embodiment. However, rather than the first pressing station 90 being along the second run 42, it is located at a first vertical run 261 which follows the second inclined run 42. Further, the second pressing station 110 is located at a second vertical run 262 which follows the first vertical run 261. The belt structure 11 travels downwardly along the first vertical run 261 and upwardly along the second vertical run 262.

At the two pressing stations 90, 110, the cams on opposed sides of the tubular structure 21 locate between each other to subject the tubular structure to a peristaltic pressing action. This can be best seen in FIG. 15 which illustrates the press station 90 along the first vertical run 261. The pressing station 90 comprises the two cyclically movable structures 91 on opposed sides of the vertical run 261. The cams 101 on the two inner runs 97 are in an offset relationship such that one cam of one inner run aligns with the spacing between two cam of the other inner run. With this arrangement, the tubular structure 21 is subjected to a peristaltic pressing action between the interacting cams 101.

In addition to applying compressive force to the tubular structure 21, the cams 101, 123 at the two pressing stations 90, 110 serves to control the rate at which the sludge material advances as the belt structure moves through the first and second vertical runs 261, 262. In particular, the cams 101 at the first pressing station 90 interact to retard downward migration of the sludge material (under the influence of gravity) at a faster rate than the downwardly moving first run 261. Further, the cams 123 at the second pressing station 110 interact to assist in uplifting the sludge material contained in the upwardly moving second vertical run 262 to counteract the affect of gravity.

In this embodiment, the first and second runs 41, 42 provide two generally vertical columns 270 and the discharge run 44 of the apparatus 250 is located uppermost. This may be advantageous in certain applications.

Referring now to FIGS. 16 to 21, there is shown a belt filter apparatus 300 according to a fourth embodiment for treating material to separate solid and liquid phases thereof. The apparatus 300 has been devised particularly for treating sewage for the purposes of dewatering the sewage to facilitate recovery of the solid matter for subsequent treatment. There may, of course, be various other applications for the belt filter apparatus.

The apparatus 300 comprises an endless belt structure 311 passing around guide rollers 313.

The endless belt structure 311 comprises an elongate belt portion 315 formed of water permeable material such as for example a flexible filter pad material. The belt portion 315 has two opposed longitudinal edges 317, 318. The endless belt 311 further comprises a connection means 319 for releasably connecting the two longitudinal edges 317, 318 together so as to form a tubular structure 321 having a flexible side wall 322. The connection means 319 comprises a slider connector means in the form of a zipper. The slider connector means 319 comprises a male connector 323 provided along longitudinal edge 317 and a complimentary female connector 325 provided along longitudinal edge 318. The endless belt 311 further comprises two endless bolt ropes 331, 332 connected to the belt portion 315. The bolt ropes 331, 332 are guidingly received in grooves in the rollers 313 that float independently on springs or arms to ensure proper tracking of the endless belt 311 around the rollers 313.

The apparatus 310 includes an assembly zone 333 at which the longitudinal edges 317, 318 of the belt portion 315 are connected together by way of the connection means 319 to form the tubular structure 321, and as disassembly zone 335 at which the connection means 319 is released to separate the longitudinal edges 317, 318. The assembly zone 333 includes a first slider 334 3 which operates in conjunction with the male and female connector elements 323, 25 to move them together into zipping engagement. The disassembly zone 335 includes a second slider 336 also operating in conjunction with the male and female connector elements 323, 235 to progressively pull them apart in an unzipping action. With this arrangement, the longitudinal edges 317, 318 of the belt portion 315 are continuously connected together at the assembly station 333 and the interconnected longitudinal edges 317, 318 are continuously separated at the disassembly zone 335 so as to split the tubular structure 321, as the endless belt 311 circulates around the guide rollers 313.

Supplementary guide rollers are provided between the guide rollers 313a and the assembly zone 33 so as to progressively move the belt portion 315 from an open and generally flat condition, through an arcuate condition, and to ultimately assume a closed condition at which the longitudinal edges 317, 318 are connected together by way of the connection means 319 under the action of the first slider 334. The supplementary guide rollers comprise "V" roller to fully stretch the belt portion 315 to maintain a generally uniform tension on the belt portion as it is zipped open and close. Similarly, supplementary guide rollers are provided between the disassembly zone 335 and the roller 313b to progressively move the belt portion 315 from the closed condition to the open and generally flat condition. The belt portion 315 is in the open and generally flat condition as it passes around rollers 313b, 313c, and between roller pairs 313a, 313b, 313c and 313d.

The circulating path around which the endless belt structure 311 includes a vertical run 341 extending between rollers 313a and roller 313f. The tubular structure 321 includes a chamber portion 343 extending downwardly from the assembly zone 333. In other words, the chamber portion 343 is established at the time that the longitudinal edges 317, 318 of the belt portion 315 are connected together by the connection means 319. With this arrangement, the upper end 345 of the chamber portion 343 is open to receive sewage material 346 for treatment (depicted by wavy lines and identified by reference number 346). A delivery means 347 is provided for introducing the sewage material 346 into the chamber portion 343. The delivery means 347 includes a delivery pipe 349 having an outlet end 351 which extends into the sewage material contained in the chamber portion 345 so as to be submersed therein. This avoids excessive splashing of sewage material delivered into the chamber portion 343. A float valve 352 associated with the delivery means 347 regulates delivery of sewage material into the chamber portion 343 on an ongoing basis.

The bottom end 353 of the chamber portion 343 is closed by confinement of the tubular structure 321 to impede liquid flow therethrough. The confinement of the tubular structure 321 is achieved by laterally inward collapsing of the flexible side wall 322 to reduce the cross-sectional area bounded by the side wall. The flexible side wall 322 is urged inwardly into the collapsed condition under the influence of guide means 357 comprising two press rollers 358, 359 between which the tubular structure 321 passes. Each press roller 358, 59 is cradled on respective support rollers 361 so as to be freely rotatable thereon. The advantage of the pneumatic tyres is that the more inflation pressure the more the tyres lock into position and extract the maximum fluid from the sludge. This will operate to the maximum pressure in the tyres then they will force out and release the tyre as it deforms. Alternatively, the rollers 358, 359 may be supported on arms carried on springs.

A collection structure 363 is positioned around and below the chamber portion 343 for collection of liquid effluent (primarily water) discharging from the chamber portion 343. The discharging liquid effluent is illustrated in FIG. 16 of the drawings by dotted lines and identified by reference numeral 365. The liquid effluent 365 can discharge from the chamber portion 343 through the water permeable side wall 322 of the chamber portion 343 by virtue of the chamber portion 343 being assembled from the water permeable belt portion 315. In this way, the first stage of a filtering process is performed, with liquid effluent draining from the chamber portion 343 under the influence of gravity for collection in the collection structure 363. The collection structure 363 incorporates discharge paths 369 from which the collected liquid effluent can be removed from the collection structure 363 and delivered to another location for further processing or handling as necessary.

Solid matter retained within the chamber portion 343 tends to settle towards the bottom 353 thereof. As the tubular structure 321 passes between the press rollers 358, 359 the solid matter is squeezed so as to express liquid therefrom in a first pressing operation. The expressed liquid can then discharge through the liquid permeable side wall 322 and discharged into the collection structure 363. The various stages of the inward collapsing of the side wall 322 of the tubular structure 321 are illustrated in FIGS. 19, 20 and 21 of the drawings. In particular, FIG. 19 is a cross-sectional view of the tubular structure in its circular condition prior to any confinement. In this condition, the tubular structure 321 is effectively inflated by the sewage material 46 contained therein. FIG. 20 is a cross-sectional view illustrating the tubular structure 321 during inward collapsing thereof, at a location where the tubular structure is entering the space between the two press rollers 358, 359. FIG. 21 is a cross-sectional view illustrating the tubular structure 321 in a fully collapsed condition at a location where it is fully pressed between the two press rollers 358, 359.

The collapsed tubular structure 321 undergoes a further pressing operation at stage 373. The pressing stage 373 comprises two secondary press rollers 375, 377 between which the collapsed tubular structure is passed to further press the solid matter confined therein to express further liquid from it. The secondary pressed rollers 377, 379 are each rotatably supported on respective cradle rollers 381. A secondary collection structure 383 is provided for collecting water extracted during the secondary pressing operation.

Following the secondary pressing operation, the collapsed tubular structure 321 circulates around a series of press rollers 313*h*, 313*g*, 313*f* and 313*e* to further express remnant liquid effluent from the solid matter confined within the tubular structure 321. The liquid effluent is collected by a collection structure 385 in the form of a tray 387 positioned below the series of rollers. After leaving the series of rollers, the tubular structure 321 approaches the disassembly zone 335 at which the connection means 319 is engaged by the second slider 336. The second slider 336 operates to separate the male and female connector elements 323, 325 in an unzipping action. This achieves longitudinal splitting of the tubular structure 321 and allows the belt portion 315 to open from the closed condition to the flat condition (somewhat in the reverse of the movement through which it went in approaching the first slider 334). The belt portion 315 then passes around rollers 313*d*, 313*c*, 313*b*, and 313*a*, in an open generally flat condition as it approaches the assembly zone 333.

A collection zone 395 is provided for receiving solid matter falling from the belt portion 315 as it opens from the tubular structure 21. The collection zone 95 in this embodiment is in the form of a belt conveyor 397 which transfers the collected solid matter to another location for subsequent processing.

A scraper mechanism 399 is provided for scraping the side of the belt portion 315 which previously defined the inner side of the tubular structure 321 to remove any remnant solid matter therefrom. A vacuum system 401 is also provided to further assist in removal of remnant solid matter.

A particular feature of the belt filter apparatus 300 according to this embodiment is that gravity is used to promote and assist the circulating movement of the belt structure 311 around the guide rollers 313. In this regard, the vertical orientation of the chamber portion 343 biases the tubular structure 321 in a downward direction along run 341, so assisting the circulating movement of the belt structure. The movement of the belt is also facilitated by drive applied to any one or more of the guide rollers 313 as appropriate.

From the foregoing, it is evident that apparatus 300 provides a simple yet highly effective arrangement for separating solid and liquid components in a material such as sewage undergoing treatment. The separation involves a first filtering stage whereby water drains from the chamber portion 343 under the influence of gravity. Liquid within the chamber portion 343 of the tubular structure 321 can drain therefrom through the liquid permeable side wall 322, spreading evenly around the periphery of the chamber portion. This is caused and enhanced by the hydrostatic pressure generated by the column of liquid moving through the permeable side wall of the chamber portion drawing the sludge with it. The material spreads evenly on the side wall 322 of the chamber portion 343 because the liquid flows to points of low density/resistance and avoids points of high density/resistance. In this way, an even layer of sludge is deposited around the side wall of the chamber portion. Once deposited, the sludge is evenly compacted by the hydrostatic pressure of the liquid behind it, forcing the sludge against the side wall of the chamber portion. During this stage, solid matter also migrates towards the bottom of the chamber portion 343 also under the influence of gravity. The mass of solid matter urges the tubular structure 321 to pass between the press rollers 358 and 359, during which the solid matter is pressed to extract liquid effluent therefrom, with the extracted liquid effluent passing through the liquid permeable side wall of the tubular structure. Further pressing stages are conducted before the solid matter is removed from the belt filter.

Referring now to FIGS. 22 to 25 of the drawings, there is shown a belt filter apparatus 400 according to a fifth embodiment. The belt filter apparatus 400 is somewhat similar to the belt filter apparatus according to the fourth embodiment with the exception that the belt portion 315 comprises two belt sections 411, 412. Each belt section 411, 412 comprises liquid permeable material such as for example a flexible filter pad material. Each belt section 411, 412 also has two opposed longitudinal edges 417, 418, and a bolt rope 430 connected thereto adjacent one edge. Connection means 419, 420 are provided for releasably connecting one longitudinal edge portion of each belt section to an adjacent longitudinal edge portion of the other belt section to form the tubular structure 321, as best illustrated in FIG. 23.

Referring now to FIGS. 26 and 27 there is shown a belt filter apparatus 450 according to a sixth embodiment. The belt filter apparatus 450 is somewhat similar to the belt filter apparatus according to the fourth embodiment with the exception that the two press rollers 358, 359 which provide the guide means 357 are further spaced in order to provide the chamber portion 343 with a thicker neck 344 between the two rollers 358, 359. A column of sludge 431 is established at the neck 344 and travels beyond the rollers 358, 359. An endless belt press 432 is provided between the guide means 357 defined by the two press rollers 358, 359 and the pressing stage 373 defined by pressed rollers 375, 377, for pressing the column of sludge 431.

As best seen in FIG. 27, the endless belt press 432 comprises two endless belts 433, 435 positioned on opposed sides of the collapsed tubular structure 321 containing the sludge column 431 to perform a pressing operation thereon. Each endless belt structure 433, 435 comprises an endless belt 437 formed of mesh material passing around spaced apart rollers 439. Each endless belt 437 has an inner run 441 which is in pressing engagement with the collapsed tubular structure 321. The inner runs 441 of the two endless belts 437 co-operate to apply a pressing force to the collapsed tubular structure 321 to assist in expressing remnant liquid effluent from the sludge column 431 contained within the tubular structure 321. The liquid effluent can pass through the perforated construction of the endless belts 437.

The thickened neck 344 assists in stopping the reflux of sludge at the bottom end of the chamber portion 343 back into the main part of the chamber portion owing to the influence of the guide rollers 358, 359.

Referring now to FIGS. 28 and 29, there is shown a belt filter apparatus 500 according to a seventh embodiment. The belt filter apparatus 500 is somewhat similar to the belt filter apparatus 450 according to the sixth embodiment, with the exception that each endless belt 437 is provided with transverse cleats 451 at spaced intervals along the length thereof. The cleats 451 on the two endless belts 437 co-operate to press the collapsed tubular structure 321 and divide the sludge column 431 contained therein into sections or batches 453 each of a size corresponding to the spacing between adjacent cleats. The cleats 451 come together to form closed chambers each containing one of the sludge column sections or batches 453. The closed chambers serve to stop sludge returning to the chamber portion 343 as a result of the compressive affect provided by the endless belts.

It should be appreciated that the scope of the invention is not limited to the scope of the embodiments previously described. In particular, it should be appreciated that the belt filter apparatus according to the invention may have applications in various fields for filtering material having liquid and solid components and is not restricted to the treatment of sewage.

Additionally, it should be understood that apparatus according to the invention may be used for handling and/or treatment operation of any appropriate type, typical examples of which are provided in the following embodiments.

Referring now to FIGS. 30, 31 and 32, there is shown apparatus 550 according to an eighth embodiment. The apparatus 550 is provided for subjecting a material to a treatment operation. In this embodiment, the material comprises particulate material such as fine or course grindings which are to be subjected to a treatment liquid such as an acid for a leaching process.

The apparatus 550 comprises a tank 551 defining a bath 552 containing a volume of the treatment liquid. The material undergoing treatment is transported through the bath 552 in a tubular structure 553. As was the case with earlier embodiments, the tubular structure 553 is assembled from an endless belt portion 557 of an endless belt structure 559 adapted to circulate around a path incorporating guide rollers.

A delivery means 563 is provided for delivering the material to be processed into the tubular structure 553 through the open end 555 thereof.

The path around which the endless belt structure circulates passes through the bath 552. The section 565 of the tubular structure 553 within the bath 552 travels along a circuitous route in which the tubular structure 553 passes around rollers 567 within the bath 552.

The endless belt portion 557 from which the tubular structure 553 is assembled comprises material permeable to the treatment liquid contained within the bath 552, such that the material confined within the tubular section is exposed to the treatment liquid as it passes through the bath.

The tubular structure 553 may be of any appropriate profile in cross-section, from a fully rounded condition to a generally flat condition. Where the tubular structure 553 has been filled with material to be processed, it is likely to be bloated and therefore assume a fully rounded condition. In other circumstances, however, the tubular structure 553 may not be completely filled with material for processing, in which case it is likely to assume a somewhat flattened condition.

In the arrangement shown, the apparatus 550 includes an injection system 570 for injecting treatment liquid into the tubular structure 553 to ensure intimate contact between the material undergoing treatment and the treatment liquid. The injection system 570 comprises an injection chamber 573 through which the tubular portion 553 passes as it moves through the bath 552. The injection chamber 573 is defined within an injection collar structure 574. The injection collar structure 574 has an entry 575 and an exit 577 through which the tubular portion sealingly enters and exits the chamber 573. The chamber 573 surrounds the tubular portion 553 within the confines of the collar structure 574, as be seen in FIG. 31 of the drawings. An inlet 579 is provided for injecting the treatment liquid into the injection chamber 573, the arrangement being that the injected treatment liquid is confined within the chamber and exposed to the portion of the tubular structure 553 passing therethrough. The treatment liquid confined within the chamber 573 can contact the material undergoing treatment within the tubular structure 553 through the permeable side wall of the tubular structure.

There are in fact two injection systems 570, one being a first injection system 571 on the approach side of the rollers 567 and the other being a second injection system 572 on the departure side of the rollers.

The apparatus 550 may further comprise an extraction system 580 for extracting treatment liquid confined within the tubular structure 553 after the material has emerged from the treatment liquid within the bath 552. The extraction system 580 comprises an extraction chamber 581 defined within an extraction collar structure 583 having an entry 585 and an exit 587 through which the tubular structure 553 sealingly enters and exits the extraction chamber. An inlet 591 is provided for introducing an extraction fluid such as compressed air into the extraction chamber 581 for the purposes of expelling remnant treatment liquid from the material confined within the tubular structure. In the arrangement shown, the extraction fluid is introduced into the extraction chamber 581 from the upper side thereof. With this arrangement, the extracted liquid can discharge into the lower portion of the extraction chamber 581 from where it can be collected and possibly recycled. The underside of the extraction chamber 581 is perforated so that the extracted liquid can drain from the extraction chamber into a tray 595 from which it can drain into the bath 552.

As the profile of the tubular structure 553 can vary in cross-section (from a generally round condition to a somewhat flattened condition, as previously explained), it is necessary that the entry 575 and exit 577 of the injection collar structure 574, and also the entry 585 and exit 587 of the extraction collar structure 583, have provision to accommodate the various potential cross-sectional profiles.

Referring to FIGS. 33, 34 and 35, there is shown apparatus 600 according to a ninth embodiment. The apparatus 600 is similar in many respects to the apparatus 550 according to the previous embodiment and so corresponding reference numerals are used to identify corresponding parts. In this embodiment the tank 551 does not define a bath but rather a collection area 601 from which treatment liquid introduced into the tubular structure 553 can drain. There are two injection systems 570, one being a first injection system 571 on the approach side of the rollers 567 and the other being a second injection system 572 on the departure side of the rollers. In each case, the injected treatment liquid can drain from the permeable side wall of the tubular structure 553 and be collected in the collection area 601.

Referring now to FIG. 36 of the drawings, there is shown an apparatus 650 according to a tenth embodiment. The apparatus 650 is provided to expose a material undergoing treatment to a series of treatment stages. In a typical arrangement, the treatment stages may comprise a first acid treatment, a second acid treatment and an alkaline treatment for neutralising the acid treatments. Thus, the apparatus provides a series of treatment liquids, there being three such treatment liquids in this embodiment. Specifically, the apparatus 650 comprises a first treatment tank 651, a second treatment tank 652 and a third treatment tank 653. The material undergoing treatment is conveyed sequentially through the three treatment tanks in a tubular structure 655 formed from an endless belt structure 657 adapted to circulate around a path incorporating guide roller structures 659, as was the case with earlier embodiments.

The endless belt structure 657 is assembled into the tubular structure 655 at an assembly zone 661 and is split at a disassembly zone 663 at which the treated material can discharge at a collection zone 665. First and second pressing stations 667, 669 are provided in the path around which the endless belt structure passes between the third treatment tank 653 and the disassembly zone 663.

While the path around which the endless belt structure 657 circulates is shown schematically in FIG. 36 as passing below the three tanks 651, 652 and 653, it should be understood that in a practical application it is more likely that the path would pass to the side of the three reservoirs.

Referring now to FIGS. 37 and 38, there is shown apparatus 700 according to an eleventh embodiment. The apparatus 700 is adapted to provide a crushing operation to a target material. In the arrangement shown, the crushing operation comprises three crushing stages, being a first crushing stage 701, a second crushing stage 702 and a third crushing stage 703. The target material is conveyed through the three crushing stages in a tubular structure 705 assembled from an endless belt structure 707, in a similar manner to previous embodiments. As with the previous embodiment, the tubular structure 705 can be of any appropriate profile in cross-section, including a generally rounded profile or a somewhat flattened profile. The tubular structure 705 is assembled at an assembly zone 711 and is split at a disassembly zone 713 from where the crushed target material can discharge to a collection area 715.

Each crushing stage 701, 702, 703 comprises two rollers 721, 722 between which the tubular structure 705 passes to be subjected to compression (as shown in FIG. 37), thereby applying a crushing action to the target material. Liquid expressed from the target material in the crushing action can discharge through the permeable side wall of the tubular structure 705. A collection means 725 is provided at each crushing station for collecting the liquid discharging from the tubular structure.

FIG. 38 illustrates that the run of the endless belt structure 707 between the third crushing zone 703 and the collection area 715. From this view, it can be seen that the return run of the endless belt structure 707 is located to one side of the run of the tubular structure 705 and the three crushing stages.

Referring now to FIGS. 38 to 42, there is shown apparatus 750 according to a twelfth embodiment. The apparatus 750 is provided for subjecting a target material to a series of treatments. A typical application of the apparatus 750 may be in the field of mineral processing where it can be necessary to subject a target material to a series of treatment stages.

In the apparatus 750, the target material is conveyed through the series of treatment stages in a tubular structure 751 assembled from an endless belt structure 753 circulating through a path, as was the case with previous embodiments. The tubular structure 751 is assembled at an assembly zone 755 and disassembled at a disassembly zone 757.

In the arrangement shown, the target material is conveyed through four treatment zones, each corresponding to one treatment stage. The first treatment zone 761 involves injection of a treatment liquid into the target material. The second treatment zone 762 involves extraction of the treatment liquid from the target material. The third treatment zone 763 involves injection of further treatment liquid into the target material. The fourth treatment zone 764 involves extraction of the further treatment liquid from the target material.

At the first treatment zone 761 there is provided an injection system 771 comprising an injection chamber 773 through which the tubular structure 751 passes. The injection system 771 includes an inlet 775 through which the treatment liquid can be introduced into the injection chamber 773 from where it can penetrate the permeable wall of the tubular structure 751 to contact the target material confined therein. The underside of the injection chamber 773 is perforated so that surplus treatment liquid can drain from the injection chamber 773 for collection in a collection chamber 777.

The second treatment stage 762 comprises an extraction system 780 for passing an extraction fluid such as compressed air through the tubular structure 751 to convey surplus treatment fluid from the target material. The extraction system 780 comprises a hood 781 above the tubular structure 751 and a perforated base 783 below the tubular structure. With this arrangement, the hood 781 delivers compressed air to the upper side of the tubular structure 751 from where it flows under pressure laterally through the target material to discharge on the underside thereof, carrying the surplus treatment liquid. In the arrangement shown, the perforated support 783 comprises an endless belt 784, in which the belt portion thereof is formed of mesh or other perforated material. A collection zone 789 is provided on the underside of the support 783 for collecting the extracted material.

The third treatment zone 763 is of similar construction to the first treatment zone 761.

Similarly, the fourth treatment zone 764 is of similar construction to the second treatment zone 762.

Apparatus according to the invention may also be used for transporting material, particularly sludge material, without necessarily also exposing the target material to a treatment process.

Figure 43:
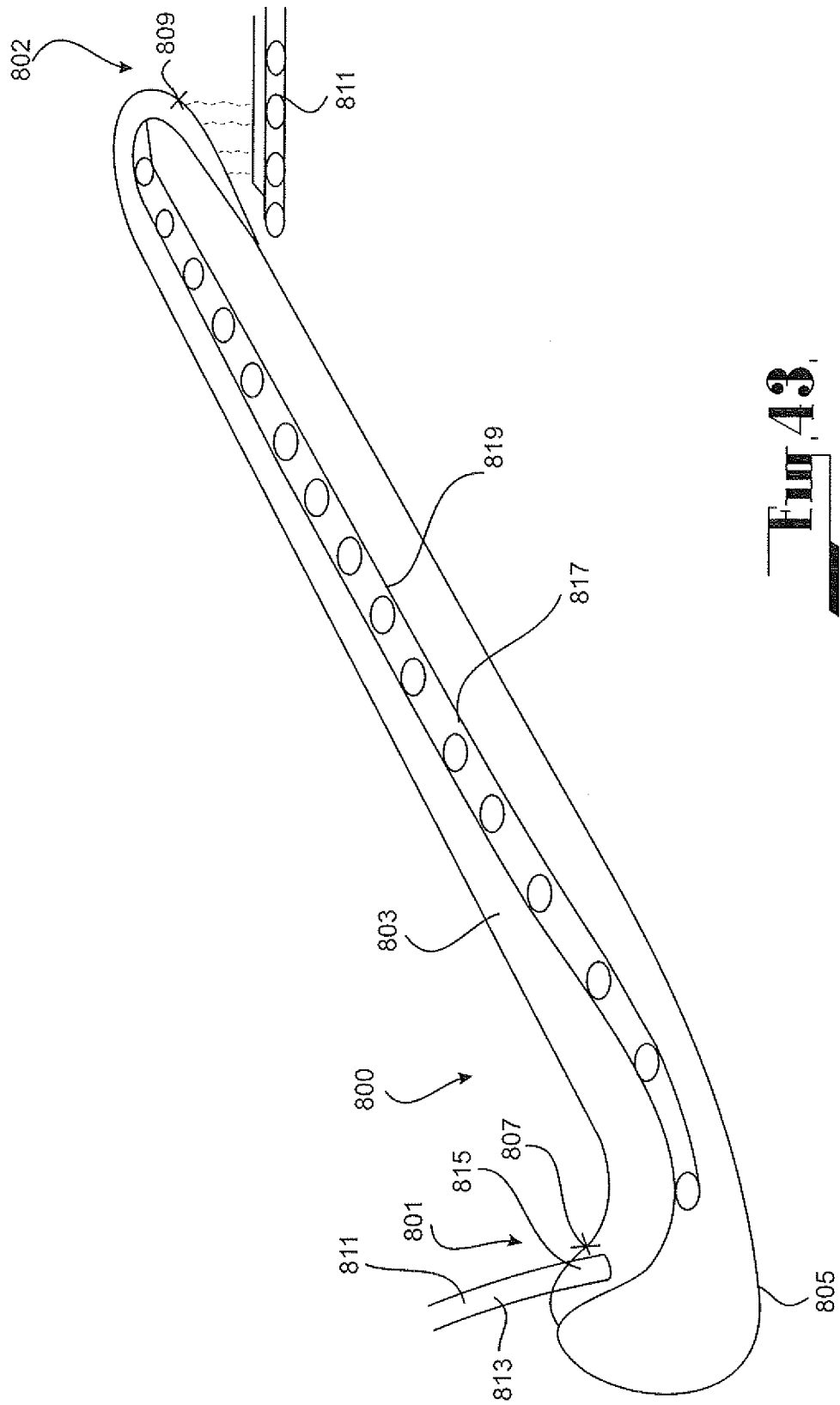
FIG. 43 is a schematic elevational view of apparatus according to a thirteenth embodiment.

Referring now to FIG. 43 of the drawings, there is shown apparatus 800 according to a thirteenth embodiment. The apparatus 800 is provided for conveying a material from a first location 801 to a second location 802. In the arrangement shown, the second location 802 is elevated in relation to the first location 801. However, the two locations can be at any appropriate disposition relative to each other, including at approximately the same level.

The target material for transportation is conveyed from the first location 801 to the second location 802 in a tubular structure 803 assembled from an endless belt structure 805 circulating around a path, as was the case with previous embodiments. The tubular structure 803 is assembled at an assembly zone 807 at the first location and split at a disassembly zone 809 at the second location 802. At the second location 802, the material is discharged from the split tubular structure 803 onto a collection means 811.

As was the case with previous embodiments, the material is introduced into the tubular structure 803 through a delivery means 811 including a delivery line 813 communicating with the open end 815 of the tubular structure 803.

In this embodiment, the side wall of the tubular structure 803 is not be permeable to the material being transported.

A support structure 817 such as an endless belt conveyor 819 is provided to support the run of the tubular structure 803 between the two locations.

From the foregoing, it is evident that apparatus according to the various embodiments can perform a wide range of materials handling and treatment operations.

It should be appreciated that the scope of the invention is not limited to the scope of the embodiment described.

Modifications and improvements can be made without departing from the scope of the invention.

Throughout the specification, unless the context requires otherwise, the word "comprise" or variations such as "comprises" or "comprising", will be understood to imply the inclusion of a stated integer or group of integers but not the exclusion of any other integer or group of integers.

We claim:

1. An apparatus for performing an operation on a material, comprising:
an endless belt structure adapted to circulate around a path incorporating guide roller structures around which the belt structure passes, the belt structure defining one or more elongate sheets movable along the path, the one or more elongate sheets being adapted to be releasably connected together along longitudinal edges thereof to assemble a movable tubular structure within which at least part of the operation is to be performed, wherein the tubular structure can be continuously assembled at one end thereof and continuously disassembled at the other end thereof during movement of the belt structure,
the belt structure comprising a belt portion and two endless funicular elements being adapted to support the belt portion therebetween,
wherein each guide roller structure comprises two wheels each having an outer periphery configured to guidingly receive a respective one of the funicular elements whereby the funicular elements are supported on the guide roller structure and the belt portion is supported between the funicular elements, and wherein the belt portion comprises two connected belt sections, both belt sections extending along the entire length of the belt portion, wherein one of the belt sections is foldable and split so as to create two releasably interconnectable opposite longitudinal edges.

2. The apparatus according to claim 1, wherein the one or more elongate sheets are adapted to be releasably connected along longitudinal edges thereof by a slidable connector means.

3. The apparatus according to claim 2, wherein the slidable connector means is a zipper.

4. The apparatus according to claim 1, further comprising means for introducing material on which the operation is to be performed into the tubular structure.

5. The apparatus according to claim 1, further comprising means for compressing the tubular structure along a portion thereof to express liquid from the solid phase matter contained in the tubular structure.

6. The apparatus according to claim 5, wherein the means for compressing the tubular structure comprises a press for mechanically compressing the tubular structure.

7. The apparatus according to claim 6, wherein the press is adapted to apply a linear pressing action to the tubular structure.

8. The apparatus according to claim 7, wherein the press comprises a cyclically movable structure having an inner run at one side of a pressing zone along which the tubular structure can pass to be subjected to compression.

9. The apparatus according to claim 8, wherein the press comprises a further cyclically movable structure having an inner run at the opposed side of a pressing zone, and wherein the inner runs of the two cyclically movable structures cooperate to define the pressing zone.

10. The apparatus according to claim 8, wherein the or each cyclically movable structure comprises two endless bands disposed in spaced apart side-by-side relation and carrying a plurality of spaced cams adapted to cooperate to subject the tubular structure to a compressive action to create alternating zones of constriction and dilation.

11. The apparatus according to claim 10, wherein the cams comprise elongate rollers supported between the two endless bands to extend in a direction transverse to the direction of the travel of the endless belt structure.

12. The apparatus according to claim 1, wherein the tubular structure is subjected to compression as it undergoes deflection in passing around one or more of the roller structures.

13. The apparatus according to claim 1, wherein the tubular structure undergoes compression as a result of tension which is exerted on the tubular structure by virtue of axial tension on the belt portion and also tension arising from the loading exerted by material contained within the tubular structure.

14. The apparatus according to claim 1, further comprising separating means for longitudinally splitting the tubular structure for discharge of matter contained therein.

15. The apparatus according to claim 14, wherein the longitudinal splitting comprises disassembly of the tubular structure.

16. The apparatus according to claim 14, wherein matter discharges from the belt portion after longitudinal splitting of the tubular structure by falling from the belt portion under the influence of gravity.

17. The apparatus according to claim 15, further comprising removal means for removing remnant matter from the or each elongate sheet after splitting of tubular structure.

18. The apparatus according to claim 1, wherein the tubular structure is open at said one end thereof to receive the material on which the operation is to be performed.

19. The apparatus according to claim 1, wherein longitudinal side edges of the belt portion are adapted to be releasably connected together to form the tubular structure.

20. The apparatus according to claim 1, further comprising two or more belt sections, with one longitudinal edge of each belt section being releasably connected to an adjacent longitudinal edge of a neighboring belt section.

21. The apparatus according to claim 19, wherein at least part of the belt portion is formed of water permeable material.

22. The apparatus according to claim 21, wherein the belt portion is formed entirely of the water permeable material.

23. The apparatus according to claim 19, wherein the belt portion comprises two interconnected longitudinal sections, with one longitudinal section being split to provide the two longitudinal edges.

24. The apparatus according to claim 1, wherein the material comprises matter having solid and liquid components and wherein the operation performed by the apparatus comprises separation of the solid and liquid components within the matter.

25. A method of treating a material using an apparatus comprising:

delivering the material into the apparatus, the apparatus comprising:

an endless belt structure adapted to circulate around a path incorporating guide roller structures around which the belt structure passes, the belt structure defining one or more elongate sheets movable along the path, the one or more elongate sheets being adapted to be releasably connected together along longitudinal edges thereof to assemble a movable tubular structure within which at least part of the operation is to be performed, wherein the tubular structure can be continuously assembled at one end thereof and continuously disassembled at the other end thereof during movement of the belt structure, the belt structure comprising a belt portion and two endless funicular elements being adapted to support the belt portion therebetween, wherein each guide roller structure comprises two wheels each having an outer periphery configured to guidingly receive a respective one of the funicular elements whereby the funicular elements are supported on the guide roller structure and the belt portion is supported between the funicular elements, and wherein the belt portion comprises two connected belt sections, both belt sections extending along the entire length of the belt portion, wherein one of the belt sections is foldable and split so as to create two releasably interconnectable opposite longitudinal edges, and treating the material in the apparatus.

* * * * *